United States Patent
Cheng

(10) Patent No.: US 10,878,478 B2
(45) Date of Patent: Dec. 29, 2020

(54) PROVIDING REFERRALS TO SOCIAL NETWORKING USERS

(71) Applicant: Facebook, Inc., Menlo Park, CA (US)

(72) Inventor: Derek Chirk Yin Cheng, Issaquah, WA (US)

(73) Assignee: FACEBOOK, INC., Menlo Park, CA (US)

( * ) Notice: Subject to any disclaimer, the term of this patent is extended or adjusted under 35 U.S.C. 154(b) by 697 days.

(21) Appl. No.: 15/389,127

(22) Filed: Dec. 22, 2016

(65) Prior Publication Data

US 2018/0182014 A1 Jun. 28, 2018

(51) Int. Cl.
  *G06Q 30/00* (2012.01)
  *G06Q 30/06* (2012.01)
  *H04L 12/58* (2006.01)
  *H04L 29/08* (2006.01)
  *G06Q 30/02* (2012.01)

(52) U.S. Cl.
  CPC ..... *G06Q 30/0631* (2013.01); *G06Q 30/0282* (2013.01); *G06Q 30/0643* (2013.01); *H04L 51/14* (2013.01); *H04L 51/32* (2013.01); *H04L 67/18* (2013.01); *H04L 67/22* (2013.01)

(58) Field of Classification Search
  CPC .................................................... G06Q 30/00
  See application file for complete search history.

(56) References Cited

U.S. PATENT DOCUMENTS

| | | | | |
|---|---|---|---|---|
| 2002/0038299 A1* | 3/2002 | Zernik | .................. | G06F 16/951 |
| 2006/0161496 A1* | 7/2006 | Foster | .................... | G06Q 40/04 |
| | | | | 705/37 |
| 2012/0046936 A1* | 2/2012 | Kandekar | .......... | G06Q 30/0282 |
| | | | | 704/9 |
| 2013/0254289 A1* | 9/2013 | Cutri | ....................... | H04L 51/32 |
| | | | | 709/204 |
| 2015/0067724 A1* | 3/2015 | Johnson | ............. | H04N 21/4668 |
| | | | | 725/32 |
| 2015/0172238 A1* | 6/2015 | Ahmed | .............. | H04N 21/4788 |
| | | | | 709/217 |
| 2015/0324933 A1* | 11/2015 | Allen | .................... | H04L 65/403 |
| | | | | 705/26.4 |
| 2015/0363895 A1* | 12/2015 | Zawel | .................. | G06Q 10/101 |
| | | | | 705/319 |
| 2016/0292217 A1* | 10/2016 | Sinha | .................... | G06F 3/0482 |

(Continued)

OTHER PUBLICATIONS

Felicitas, Anne, "Facebook's Recommendation Feature Leads Customers Directly to Your BUsiness." Oct. 21, 2016 (https://www.advertisemint.com/facebooks-recommendation-feature-leads-customers-directly-to-your-business/) (Year: 2016).*

*Primary Examiner* — Abby J Flynn
(74) *Attorney, Agent, or Firm* — Keller Jolley Preece

(57) ABSTRACT

The present disclosure is directed towards systems and method for providing referrals for providers of various products to users of a social networking system. In particular, the systems and methods described herein involve receiving a message from a user of a social networking system intended for a plurality of recipients and determining that the message includes a request for a referral of a product of a product. In addition, the systems and methods include providing one or more referred providers to the user and enabling the user to select an option that facilitates communication between the user and one or more of the referred providers.

20 Claims, 11 Drawing Sheets

(56) References Cited

U.S. PATENT DOCUMENTS

2016/0308798 A1\* 10/2016 Magistrado ........... H04L 51/046
2016/0335603 A1\* 11/2016 Davar ................ G06Q 10/1053
2017/0169475 A1\* 6/2017 Korpusik ............... G06Q 50/01

\* cited by examiner

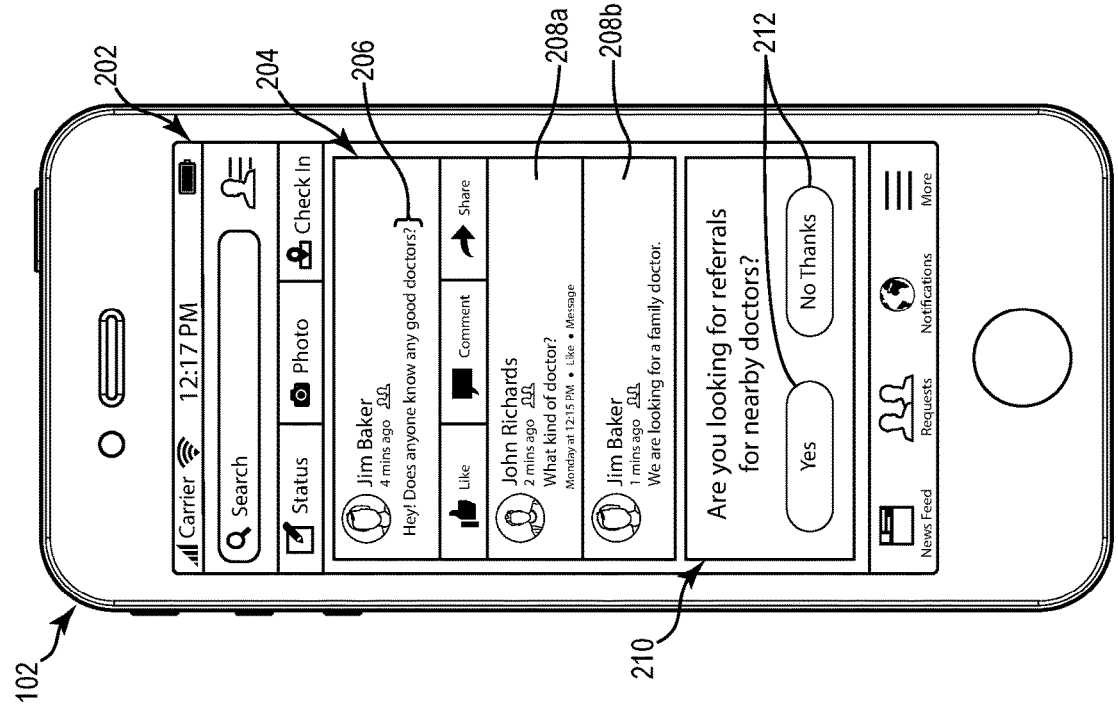
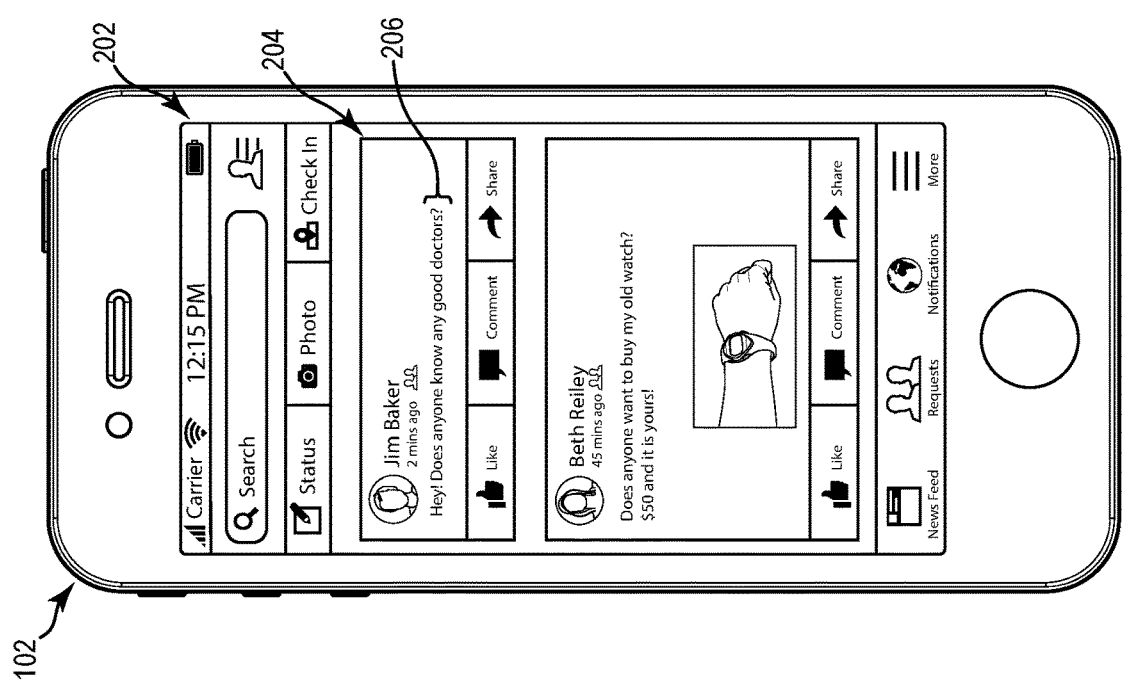
Fig. 2B
Fig. 2A

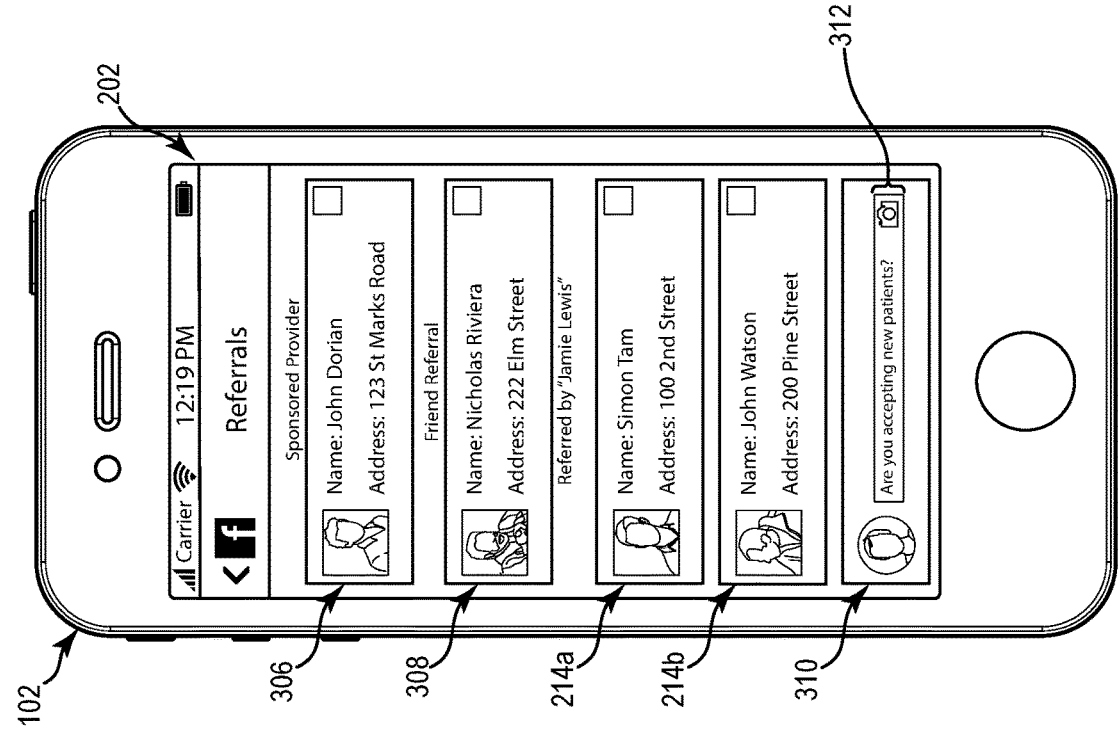
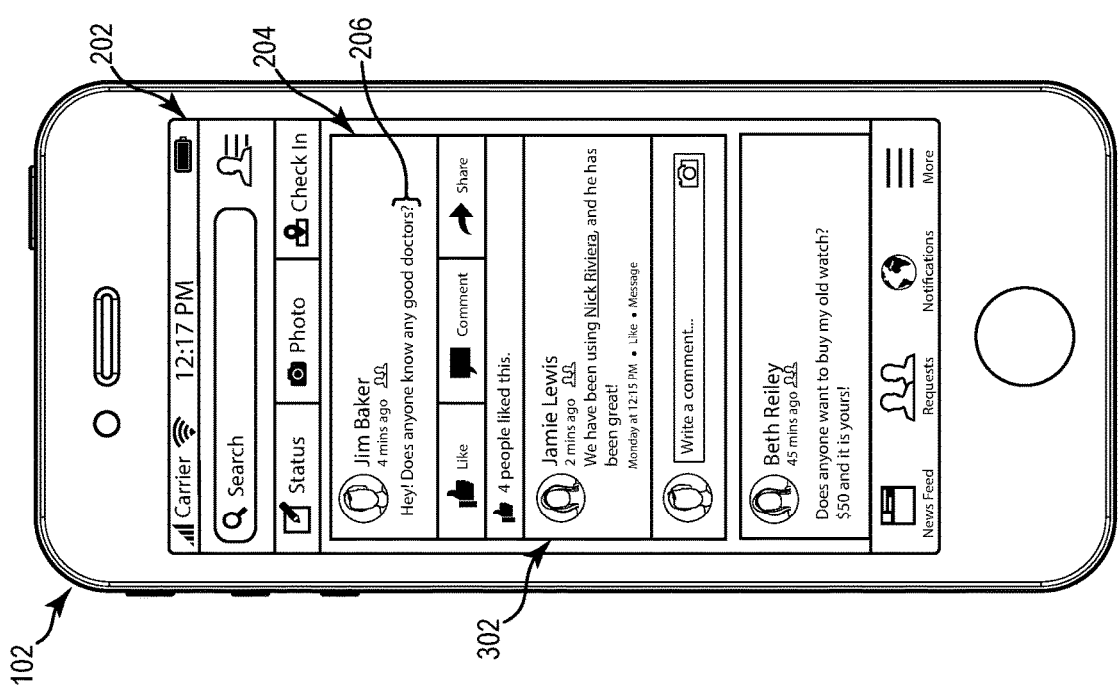
Fig. 3B
Fig. 3A

PROVIDING REFERRALS TO SOCIAL NETWORKING USERS

BACKGROUND

A social networking system enables its users to connect and communicate with other users of the social networking system. Indeed, it is now common for users of a social networking system to utilize the social networking system to communicate with friends or communities of users that exist on the social networking system. For example, social networking users often reach out to other users of the social networking system to solicit information from a group of friends or other users that might have information that could be helpful. Because of the increasing popularity of social networking systems, as well as the increasing number of users to which social networking systems have access, a social networking system may provide an ideal forum for requesting information about providers of various goods and services.

Conventionally, users of a social networking system solicit advice from a community of friends or other users to request advice about particular goods or services. For example, a user can post to a newsfeed or community page to request information about a particular company that provides a service. Responses to these requests, however, are often limited to one or two friends who happen to see the post and who are actively engaged in the social networking community. As such, many users of the intended audience fail to see the post and, as a result, do not respond. Additionally, other users may see the post after a relevant window of time has passed and similarly fail to provide helpful information.

Alternatively, many users utilize search engines to identify various providers of goods and services. For example, a user can utilize a search engine to perform a search for local businesses that provide a particular service and receive a listing of dozens of local businesses. Nevertheless, while search engines provide an effective tool for identifying popular or well-known providers of goods and services, search engines often fail to identify the best providers for a particular user performing the search. For example, many search engines fail to identify smaller or lesser-known providers of goods or services that may be particularly suited to a user's needs.

Moreover, whether a user requests information from users of a social networking system or from a conventional search engine, conventional systems and methods for requesting information about goods and services often leave a user to expend considerable time and effort to individually research providers of goods and services. For example, upon receiving multiple referrals, users often contact individual providers to obtain price quotes or request timelines for when a particular provider will be able to provide a service or goods. Contacting each referral often results in a time consuming and burdensome process, particularly when researching a large number of providers.

Thus, there are a number of disadvantages with convention systems and methods for acquiring information related to providers of various goods and services.

SUMMARY

One or more embodiments described herein provide benefits and/or solve one or more of the foregoing problems in the art with systems and methods for providing referrals to users of a social networking system. In particular, in one or more embodiments, the disclosed systems and methods analyze a message from a social networking user to identify a request for referrals of a provider of a particular good or service. In response, the systems and methods determine recommended providers for the social networking user based on various factors associated with the user and other users of the social networking system. For example, the systems and methods described herein can identify providers based on feedback received about various providers from friends of the user. Additionally, the systems and methods can provide a referral for the identified providers of the particular good or service to the user. As such, the disclosed systems and methods specifically tailor the referrals and corresponding information to the user's unique preferences and needs.

Further, the disclosed systems and methods can facilitate communication between the user and one or more referred providers. For example, in one or more embodiments, the systems and methods provide an option for a user to contact referred providers of goods or services. In some instances, the systems and methods enable a user to simultaneously contact referred providers to request additional information from each individual provider. Additionally, the systems and methods enable a user to receive communications from contacted providers. As such, systems and methods described herein enable a user to conveniently gather information about referred providers and engage the services of the various referred providers.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and marketing features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIG. 2A illustrates an example graphical user interface including a message including a request for a referral in accordance with one or more embodiments;

FIG. 2B illustrates an example graphical user interface including an indication of the request for the referral in accordance with one or more embodiments;

FIG. 3A illustrates an example graphical user interface including one or more user-identified referrals of providers in accordance with one or more embodiments;

FIG. 3B illustrates an example graphical user interface including another example listing of identified providers in accordance with one or more embodiments;

DETAILED DESCRIPTION

Figure 1:
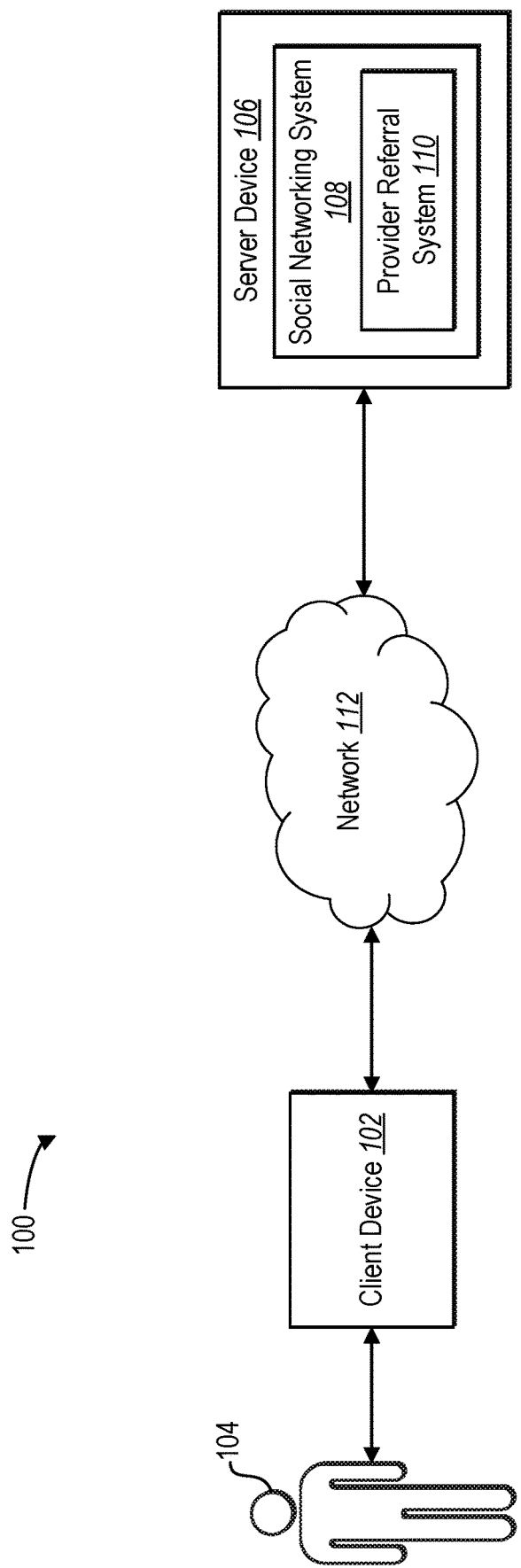
FIG. 1 illustrates a block diagram of an environment in which a provider referral system is implemented in accordance with one or more embodiments.

One or more embodiments described herein include a provider referral system that provides referrals to a user of a social networking system for providers of products (e.g., goods and/or services) in response to one or more messages provided to other users of the social networking system. In particular, the provider referral system can analyze one or more messages from a social networking user to identify an intent of the user to solicit referrals for providers of a particular product. In addition, the provider referral system identifies providers of the product that meet a set of criteria for the requesting user and provides the identified providers (e.g., referred providers) to the user via the social networking system. Furthermore, the provider referral system enables the user to communicate with one or more of the referred providers via the social networking system.

As used herein, a "social networking system" refers to a system that supports and enables on-line communication, input, interaction, content-sharing, and collaboration between users (e.g., people, business, or other entities) of the social networking system. The social networking system can include any number of users including, for example, a user and any number of associated users. For example, a user can have one or more friends within the social networking system. As used herein, the term "friend" refers to a co-user associated with a user via the social networking system (i.e., a contact or connection).

As used herein, a "product" refers to goods and/or services provided by one or more providers. For example, a product can refer to a tangible good as well as a service. Additionally, as used herein a "provider" of a product or "product provider" refers to a merchant, business, individual, or other entity that provides a product or type of product to a user. As an example, a provider of a service may refer to a merchant, business, individual, or other entity that provides goods or services to consumers. Examples of providers include, for example, doctors, plumbers, electricians, dentists, landscapers, lawyers, or any entity that sells, markets, or otherwise provides a product to another entity.

As mentioned above, the provider referral system facilitates delivery of a message from a user of a social networking system to other users of the social networking system. In particular, the user can compose a message including a request for referrals and provide the message (e.g., using a client device) to the social networking system to provide to a number of intended recipients. For example, in response to receiving a message from the user, the social networking system can post the message to a webpage, newsfeed, profile page, or other location that is visible to any number of users of the social networking system.

Upon receiving and/or posting the message, the social networking system can analyze the message to determine that the user intends to solicit referrals for providers of a particular product. In particular, in one or more embodiments, upon receiving the message, the social networking system analyzes the message (e.g., text of the message) to identify a request for referrals of a provider of a product. As an example, in one or more embodiments, the social networking system performs natural language analysis to identify key words or phrases that indicate a desire of the user to request referrals for providers of a product.

Upon identifying that the message indicates an intent of the user to request referrals, the provider referral system can identify various providers of a product to refer to the user. In particular, the provider referral system can analyze a number of providers in view of various factors and criteria and identify or otherwise determine which of the providers to refer to the user. For example, in one or more embodiments, the provider referral system analyzes local businesses that perform a particular service and rates the local businesses based on various factors. The provider referral system can then provide a listing of the highest rated businesses to the user via a graphical user interface of the social networking system.

As will be described in greater detail below, in identifying, rating, and determining which providers to refer to the user, the provider referral system can consider various factors. For example, the provider referral system can consider information directly associated with the user requesting referrals (e.g., profile information, location information). Additionally, in one or more embodiments, the provider referral system considers information associated with other users of the social networking system (e.g., friends, general users, identified experts). Further, in one or more embodiments, the provider referral system considers information associated with providers having accounts on the social networking system. For example, the provider referral system can consider activity of a provider on the social networking system, popularity of the provider among other users of the social networking system, and feedback from the user or other users of the social networking system. As another example, the provider referral system can consider preferences of users of the social networking system having similar interests or preferences as the user requesting referrals. It is appreciated that the provider referral system can consider a combination of any number of factors in identifying one or more providers to refer to the user.

In addition to providing one or more referrals to the user, the provider referral system can further enable the user to communicate with one or more of the referred providers. For example, in one or more embodiments, the provider referral system provides an option that a user can select to send a request for additional information to one or all of the listed providers. Additionally, in one or more embodiments, the provider referral system enables the user to compose a message to send to an individual provider or to multiple referred providers simultaneously. For example, upon receiving a listing of providers, the user can request price quotes or availability for a particular service by composing a social networking message to simultaneously send to each of the referred providers.

Additionally, the provider referral system can enable a user to provide feedback for a particular provider. For example, where a user eventually purchases the services of a provider, the provider referral system can collect feedback about the experience of the user with the referred provider. The feedback can further be utilized by the provider referral system for providing future referrals. For example, where a friend of the user posts a message that similarly requests a referral for a provider of a similar service, the provider referral system can consider positive feedback left by the user to provide a referral to the same provider to the friend.

Thus, one or more embodiments of the provider referral system identifies that a user of a social networking system wants referrals for providers of a particular product and provides referrals that are individually suited to the user. For example, the provider referral system analyzes various factors associated with the user, friends of the user, and identified providers (e.g., local providers) to determine whether to refer a particular provider to the user. In particular, the provider referral system analyzes profile information, preferences of social networking users, and various factors associated with respective providers to identify product providers that are likely to appeal to the user requesting referrals.

Additionally, the provider referral system overcomes problems associated with soliciting referrals from a group of recipients in which only a few of the recipients will see the message and/or respond to the message with a referral. For example, by considering factors associated with recipients of the message (e.g., social networking friends of the user), the provider referral system can predict and rank providers that the recipients would have referred if the recipients of the message were to all to view and respond to the message. As such, the provider referral system enables a user to utilize resources of other social networking users even where the message may be lost among other messages received by various users of the social networking system.

Furthermore, the provider referral system enables a user to conveniently obtain additional information about referred providers via the social networking system. As an example, the provider referral system provides an option via a social networking interface for the user to contact each of multiple referred businesses simultaneously. In one or more embodiments, the provider referral system enables a user to select or compose an electronic message to send to referred providers via a graphical user interface of the social networking system. As such, a user can request information from multiple businesses without navigating to individual websites or taking the time to call or personally visit various businesses to obtain relevant information to determine which business to approach about a particular service.

In addition, the provider referral system enables users of the social networking system to provide feedback about experiences with referred providers, thus improving future referrals for other users. As an example, the provider referral system provides an interface that enables a user to select whether a user purchased a product from a referred provider and whether an experience of the user with the referred provider was positive or negative. The provider referral system can further consider the user feedback in determining referrals to provide to other users that request referrals for similar providers or similar products. Thus, the provider referral system utilizes referral feedback to improve upon future referrals to users of the social networking system.

Additional detail will now be provided regarding an environment in which the provider referral system can be implemented. For example, FIG. 1 illustrates a schematic diagram illustrating an example referral environment 100 (or simply "environment 100") for performing the processes and features described herein. For example, as shown in FIG. 1, the environment 100 includes a client device 102, a user 104 of the client device 102, and a server device 106. As further shown in FIG. 1, the server device 106 includes a social networking system 108 and provider referral system 110 implemented thereon. Additionally, as shown in FIG. 1, the environment 100 includes a network 112 over which the client device 102 and server device 106 communicates. In one or more embodiments, the environment 100 includes additional client devices and/or additional server devices that cooperatively provide the social networking system 108 and provider referral system 110.

The client device 102, server device 106, and network 112 can communicate using any communication platforms and technologies suitable for transporting and/or otherwise communicating signals and data, including any known communication technologies, devices, media, and protocols supporting of remote data communications, examples of which will be described in more detail below with respect to FIGS. 8-9. In addition, the network 112 may represent a network or collection of networks (such as the Internet, corporate intranet, virtual private network (VPN), local area network (LAN), wireless local network (WLAN), cellular network, wide area network (WAN), metropolitan area network (MAN), or a combination of multiple networks). Thus, the network 112 can include any suitable network over which the client device 102 can access the server device 106 or visa versa. Additional details and examples of networks are described below in connection with FIGS. 8-9.

Additionally, as will be described in greater detail below with regard to FIGS. 9-10, the user 104 may represent one or more users of the social networking system 108. For example, the user 104 may refer to single or multiple users associated with a particular entity that communicates with other users over a platform supported by the social networking system 108. The user 104 can receive and/or access messages and other digital content shared by other users of the social networking system 108. Likewise, the user 104 can share or otherwise provide messages and other digital content with other users of the social networking system 108. For example, a user 104 can post a message to a page, newsfeed, forum, or other virtual space on the social networking system 108 that is accessible to one or more users associated with the user 104 (e.g., friends of the user 104). As an alternative, the user 104 can directly message one or more friends or other users of the social networking system 108.

In general, the user 104 utilizes the client device 102 to generate a message to provide to friends or other users of the social networking system 108 requesting referrals for providers of a product. For example, the user 104 can compose a message asking friends on the social networking system 108 to refer businesses or individuals that provide a desired service. As shown in FIG. 1, the client device 102 provides the message to the server device 106 having the social networking system 108 thereon to display, deliver, or otherwise provide to any number of intended recipients of the message. In particular, upon receiving the message from the client device 102, the social networking system 108 can post the message to a location (e.g., newsfeed, profile page, group page, website) that is visible to any number of users of the social networking system 108.

Once the server device 106 receives the message, the provider referral system 110 analyzes the message to determine that the user 104 is interested in receiving referrals for providers of a product. In particular, upon receiving the message, the provider referral system 110 analyzes the text of the message using natural language analysis or other text processing to identify key words or phrases to determine that the user intends to request referrals from one or more recipients (e.g., friends or followers) of the message. For example, in one or more embodiments, the provider referral system 110 analyzes the text of the message to identify words such as "recommend," "refer" that indicate a desire by a user to receive referrals for providers of a product. As another example, in one or more embodiments, the provider referral system 110 analyzes the text of the message to identify phrases such as "can someone recommend" or "does anyone know" that similarly indicate a desire by the user to receive referrals. As a further example, the provider referral system 110 can analyze the text of the message to identify word associations including, for example, words such as "recommend" or "refer" within a threshold number of words from a term associated with a provider or product, such as "doctor," "dentist," "landscaper," or other term associated with a product provider.

In addition or as an alternative to analyzing text of the message from the user 104, the provider referral system 110 can analyze responses to the message (e.g., text of responses to the message) to determine that the message includes a request for providers of a product. For example, the provider referral system 110 can analyze the text of responses to identify key words or phrases such as "recommend." As another example, the provider referral system 110 can determine that a number of responses include identifications of one or more providers (e.g., names of known service providers, names of businesses). Thus, in addition to analyzing the text of the message from the user 104, the provider referral system 110 can similarly analyze text (e.g., using similar text analysis techniques) of responses to the message to identify an intent of the user 104 to request referrals.

In one or more embodiments, in response to identifying that the user 104 is asking for referrals, the provider referral system 110 identifies providers that are particularly suited for the user 104. In particular, the provider referral system 110 identifies providers that satisfy a set of criteria for the user 104. For example, the provider referral system 110 considers various factors to identify providers and additionally determine which of the providers to refer to the user 104. For instance, upon determining that the user 104 desires to receive referrals for providers of a particular product, the provider referral system 110 identifies any number of providers that are known to be capable to provide the product to the user 104.

In addition to identifying the providers that are generally capable to provide the product, the provider referral system 110 additionally analyzes the identified providers to determine which of the providers to refer to the user 104. In particular, as will be described in further detail below (e.g., in connection with FIGS. 2A-6), the provider referral system 110 analyzes the providers to score or otherwise rate the identifier providers in view of various factors that indicate a desirability of the identified providers to the user 104. For instance, the provider referral system 110 can analyze the identifier providers based on geographic proximity, popularity among friends of the user 104, popularity among general users of the social networking system 108, and other factors associated with whether the user 104 would likely have a positive experience with the providers.

Upon identifying and rating the identified providers, the provider referral system 110 can cause the server device 106 to provide one or more referred providers to the client device 102 for display to the user 104. For example, the client device 102 can display one or more referred providers to the user 104 via a graphical user interface on a display of the client device 102. In one or more embodiments, the client device 102 displays the referred providers via a social networking interface provided to the client device 102 by the server device 106 (e.g., via a web browser on the client device 102).

In addition, and as will be described in further detail below, the provider referral system 110 enables the user 104 to select one or more of the referred providers via a graphical user interface of the client device 102. For example, the client device 102 provides a social networking interface including one or more contact options that enable the user 104 to contact some or all of the providers and request additional information from the referred providers. For example, the user 104 can select an option to email, message, or otherwise request information from one or more selected providers. In one or more embodiments, the user 104 can compose or select a recommended message to simultaneously send to each of the referred providers.

Moreover, as will be described in further detail below, the provider referral system 110 can further enable the user 104 to provide feedback associated with an experience with one or more of the referred providers. For example, in one or more embodiments, the provider referral system 110 provides an interface via the client device 102 that enables the user 104 to rate or provide feedback for a referred provider that the user 104 ultimately chose from among the other referred providers. In particular, the client device 102 provides the feedback to the server device 106 and the provider referral system 110 utilizes the feedback to identify and provide referrals for other users of the social networking system 108 requesting referrals for providers of various products.

Additional features will be described with regard to example user interfaces that illustrate various features and functionality of the provider referral system 110. In particular, FIGS. 2A-5B illustrate example graphical user interfaces provided via a display 202 of a client device 102 (e.g., a mobile device) that illustrate features and functionality in accordance with one or more embodiments described herein.

By way of illustration, FIGS. 2A-5B show various views of example graphical user interfaces provided via the display 202 of the client device 102. As mentioned above, the client device 102 implements and/or provides features of the referral environment 100. In one or more embodiments, the client device 102 is a handheld device, such as a mobile phone (e.g., a smartphone). Alternatively, in one or more embodiments, the client device 102 includes a tablet device, laptop or desktop computer, a personal digital assistant device, and/or other suitable computing device capable of performing one or more of the processes and/or operations described herein. Additionally, as shown in FIGS. 2A-5B, the display 202 could include a touch screen interface that enables the user 104 to interact with elements presented via the graphical user interface.

As shown in FIG. 2A, the client device 102 provides a graphical user interface associated with the social networking system 108. For example, the provider referral system 110 can provide information to the client device 102 that enables the client device 102 to provide a social networking interface including information associated with the user 104 and other users of the social networking system 108. As illustrated in FIG. 2A, the graphical user interface includes a message 204 including text 206 that reads "Hey! Does anyone know any good doctors?"

In one or more embodiments, the user 104 composes the message 204 by interacting with the display 202 of the client device 102. For example, the user 104 can type the message 204 by touching displayed keys and/or by typing the message 204 using another input device (e.g., a keyboard).

Thus, the user 104 can compose a message requesting referrals for a provider of a product from any number of users of the social networking system 108. In one or more embodiments, the user 104 indicates a group of recipients to receive the message 204. For example, in one or more embodiments, the user 104 posts the message 204 in a way that makes the message 204 globally available to all users of the social networking system. In another example, the user 104 posts the message 204 to a in a way that results in availability only to friends or contacts of the user 104 on the social networking system 108. Alternatively, in one or more embodiments, user 104 posts the message 204 to a group page accessible to other users of the social networking system 108 that belong to the group. It is appreciated that the user 104 can further limit or expand the audience for the message 204 before or after providing the message 204 to the social networking system 108.

In one or more embodiments, the provider referral system 110 analyzes the message 204 to determine that the user 104 has requested referrals for a type of provider. For example, the provider referral system 110 analyzes the text 206 of the message 204 using natural language processing techniques to determine that the message 204 illustrated in FIG. 2A includes a request for referrals for a doctor. In particular, using one or more types of natural language analysis, the provider referral system 110 can identify key words or phrases that indicate a desire of the user 104 to receive referrals. For example, in one or more embodiments, the provider referral system 110 analyzes the text 206 of the message 204 to identify keywords (e.g., "recommend," "refer") or key phrases (e.g., "does anyone know," "can someone recommend" that indicate a desire of the user 104 to receive referrals."

As another example, the provider referral system 110 analyzes the text 206 of the message 204 using a keyword comparison to similarly determine that the message 204 specifically includes a request for referrals for a doctor. For instance, in one or more embodiments, the provider referral system 110 identifies key words or phrases within a threshold number of words from another term associated with a provider of a product. In particular, referring to FIG. 2A, the provider referral system 110 can identify the phrase "does anyone know" within a threshold number of words from the term "doctor" to determine that the message 204 includes a request for a referral of a doctor.

In one or more embodiments, the provider referral system 110 uses various text analysis techniques including, for example, natural language processing. In particular, the provider referral system 110 can segment and/or parse one or more sentences of the message 204 to identify parts of speech. In particular, the provider referral system 110 can identify discrete parts of the message and analyze relationships and meanings of the discrete parts to determine a meaning of the message. In addition, in one or more embodiments, the provider referral system 110 performs deep analytics, named entity extraction, co-reference resolution, or other natural language processing techniques to derive a meaning from the text of the message that indicates a desire of the user 104 to receive referrals. Thus, the provider referral system 110 can use a number of text analysis techniques to identify that the message 204 includes a request for referrals.

Additionally, while one or more embodiments described herein relate to requesting and providing referrals for doctors, the provider referral system 110 can similarly facilitate receiving request and providing referrals to any type of provider including, for example, plumbers, electricians, dentists, landscapers, lawyers, or any entity that sells, markets, or otherwise provides goods and/or services to another entity. Thus, one or more features described below with regard to requesting and providing referrals to doctors can similarly apply to other types of providers for other types of products.

In addition to analyzing the message 204, in one or more embodiments, the provider referral system 110 utilizes a similar analysis (e.g., natural language processing) to analyze one or more comments 208 to the message 204 to determine an intent of the user 104 to request referrals for providers of a product. For example, as shown in FIG. 2B, the message 204 includes comments 208 from other users of the social networking system 108 (e.g., recipients of the message 204). In particular, the message 204 includes a first comment 208a from a recipient of the message 204 asking "what kind of doctor?" and a second comment 208b from the original user 104 that reads "We are looking for a family doctor." Based on both the message 204 and responses to the message 204, the provider referral system 110 can determine that the user 104 is specifically interested in receiving referrals to family doctors, thus narrowing a potential search for providers to refer to the user 104.

Upon determining that the message 204 includes a request for a referral, the provider referral system 110 can enable the user 104 to confirm that the user 104 intended to request referrals from one or more recipients of the message 204. For example, as shown in FIG. 2B, the provider referral system 110 causes the client device 102 to provide a confirmation request 210 including the message "Are you looking for referrals for nearby doctors?"

The user 104 can further select one of the confirmation options 212 indicating a desire (or lack of desire) to receive rated referrals from the provider referral system 110. In response to a user selection indicating intent to receive referrals, the provider referral system 110 can cause the client device 102 to provide a listing of one or more referred doctors. Alternatively, in one or more embodiments, the provider referral system 110 causes the client device 102 to provide the listing of referred doctors without receiving a confirmation from the user 104. As will be described in further detail below, the provider referral system 110 can provide one or more referred providers via a new graphical user interface on the client device 102. Alternatively, in one or more embodiments, the provider referral system 110 provides the listing of referred providers in line with (e.g., below) the message 204 and text 206 (e.g., within the user's newsfeed).

As mentioned above, the provider referral system 110 can identify a number of providers to refer to the user 104. In particular, the provider referral system 110 can identify any number of providers within a geographic proximity of the user 104 that deal with or otherwise provide a product of interest to the user 104. For example, the provider referral system 110 can identify any providers within a defined distance (e.g., travel distance, radius) of a location of the user 104. As another example, the provider referral system 110 can identify any providers that reside in the same city, county, or state of the user 104.

Upon identifying relevant providers, the provider referral system 110 can further determine which of the identified providers to refer to the user 104. In particular, the provider referral system 110 can determine which of the identified providers are well equipped to meet the needs of the user 104 seeking a referral. In one or more embodiments, the provider referral system 110 rates (e.g., ranks, scores) the identified providers and provides a listing of the providers having the highest determined rating for the user 104. As will be described below, the provider referral system 110 can rate and ultimately determine which provider to refer to the user 104 based on a combination of different factors that indicate a measure of compatibility (e.g., a compatibility coefficient) between the user 104 and the identified providers.

For example, in one or more embodiments, the provider referral system 110 analyzes factors associated with the user 104. For instance, the provider referral system 110 can access a user profile for the user 104 on the social networking system 108 and determine a location for the user 104 as well as various preferences that indicate a level of compatibility between the user 104 and a provider. To illustrate, the provider referral system 110 may determine that providers having a location near to the user 104 (e.g., within a threshold distance) should be higher rated than providers further away (e.g., further than a threshold distance) from the user 104. In one or more embodiments, the provider referral system 110 ranks the providers based on relative distance from the user 104.

In addition, the provider referral system 110 can consider a relationship of the user 104 with the identified providers to determine a rating for the providers. For example, where the user has "liked" or otherwise favorably rated a provider, the provider referral system 110 can identify the "liked" provider as a good match for the user 104 and more likely to be a successful referral than other providers that the user 104 has not rated (or rated unfavorably). As another example, where the user 104 has directly messaged, posted to a page of the provider, or otherwise communicated with a provider via the social networking system 108, the provider referral system 110 can similarly determine a good match between the provider and the user 104 based on the existing relationship and boost a referral rating of the provider over other providers with which the user 104 has not communicated. The provider referral system 110 can further include user profile information including various preferences, demographic information, or other information available to the social networking system 108 to determine a rating for one or more of the identified providers.

In addition to considering information described above associated with the user 104, the provider referral system 110 can consider similar types of information associated with other users of the social networking system 108. In particular, the provider referral system 110 can consider location information, profile information, user ratings, preferences, or a relationship with the identified providers with other users of the social networking system 108 (e.g., other than the user 104). For example, the provider referral system 110 can consider preferences, ratings, messaging history (e.g., with the identified providers) or other information associated with all users of the social networking system 108 generally. As another example, the provider referral system 110 considers information associated with users of the social networking system 108 listed as experts in a particular field associated with the identified providers or product. As another example, the provider referral system 110 considers information associated with friends of the user 104. As another example, the provider referral system 110 considers information associated with recipients of the message 204. As another example, the provider referral system 110 considers information associated with the recipients, friends, or other general users of the social networking system 108 at a similar location as the user 104.

It is appreciated that the provider referral system 110 can consider various combinations of information associated with the user 104 and other users of the social networking system 108 to determine ratings for the identified provider. Additionally, it is appreciated that the provider referral system 110 can weight information associated with different groups of users or individual users differently than information associated with other groups or individual users. For example, the provider referral system 110 can weight information associated with the user 104, friends of the user 104 and/or recipients of the message 204 more heavily than general users of the social networking system 108 (e.g., having no direct association with the user 104). As another example, the provider referral system 110 can weight information from those users identified as experts in a particular field more heavily than general users of the social networking system 108.

As another example, in one or more embodiments, the provider referral system 110 considers location information, profile information, ratings, preferences, or a relationship with the identified providers of those recipients of the message 204 without considering information associated with any other users of the social networking system 108. In this way, the provider referral system 110 simulates a response to the message 204 by a plurality of the recipients assuming the recipients had all viewed the message and taken the effort to respond to the message 204. As such, the provider referral system 110 can predict what referrals the recipients of the message 204 would have provided had each of the recipients viewed and had a chance to engage with the message 204 from the user 104. In other words, the provider referral system 110 can simulate the responses of an attentive audience made up from the friends and other contacts of the user 104 on the social networking system 108.

Additionally, in one or more embodiments, the user 104 can modify criteria for rating identified providers by modifying the recipients of the message 204. For example, in one or more embodiments, the social networking system 108 enables the user 104 to mark the message 202 as available to friends, friends of friends, or a defined group of users. In this way, the user 104 can limit or broaden the number of users the provider referral system 110 considers in determining which providers to refer to the user 104. As such, the provider referral system 110 can modify the information that determines referred providers by modifying the audience of the message 204.

In addition to considering factors related to the user 104 and other users of the social networking system 108 (e.g., friends, recipients of the message 204, experts, general users), the provider referral system 110 can further consider factors associated directly with the identified providers. For example, as mentioned above, the provider referral system 110 can consider a relationship between the identified providers and the user 104 (e.g., user ratings, history of messages). The provider referral system 110 can consider similar relationships between the identified providers and the other individual users or defined groups of users (e.g., friends, groups) of the social networking system 108.

Moreover, in one or more embodiments, the provider referral system 110 considers an involvement of the providers on the social networking system 108. For example, as mentioned above, in one or more embodiments, providers of various products have pages, accounts, and/or profiles on the social networking system 108 that enable the providers to engage directly with various users of the social networking community. For instance, where a particular business has a page for their business, the business can post messages to a group page or send individual messages to users of the social networking system 108 that have liked the page or belong to a group associated with the page. Thus, in one or more embodiments, the provider referral system 110 considers an involvement of one or more of the identified providers with the social networking community in determining whether to refer the provider to the user 104 requesting referrals.

In one or more embodiments, the provider referral system 110 rates a provider based on a number of likes or popularity of the provider on the social networking system 108. For example, where the provider has a page or group associated with the provider's business, the provider referral system 110 can consider a number of "likes" or members of the page or group when considering a referral rating for the provider. Additionally, the provider referral system 110 can consider the demographic (e.g., location) of the various users that have liked or belong to the group associated with the provider.

In one or more embodiments, the provider referral system 110 rates providers based on a frequency of posts or messages on the social networking system 108. In particular, if the provider posts and/or engaged with users more frequently, the provider referral system 110 can rate that provider higher than providers that have a page or profile, but fail to post or message to users of the social networking system 108 regularly. As another example, the provider referral system 110 can rate providers based on a recency of posts or messages sent via a page, group, or account of the provider. In particular, the provider referral system 110 can rate providers having recent activity on the social networking system 108 higher than providers having less recent or no activity on the social networking system 108.

In one or more embodiments, the provider referral system 110 considers a messaging history of the providers with other users of the social networking system 108. For example, the provider referral system 110 can identify whether a provider typically responds to messages directed to the provider. As another example, the provider referral system 110 can determine an average time that a provider takes to respond to messages on a page or group. The provider referral system 110 can similarly identify an average time that the provider takes to respond to individual messages from users of the social networking system 108. In each of these cases, the provider referral system 110 can equate higher responsiveness or quicker turnaround on responses as a higher referral rating for a particular provider.

In addition, the provider referral system 110 can consider a conversion rate of the providers based on previous referrals made by the social networking system 108 and/or users of the social networking system 108. For example, where the social networking system 108 has referred a business to various users of the social networking system 108, the provider referral system 110 can determine how often a referral for the business is converted to a business relationship with the referral-requesting user. In particular, the provider referral system 110 can rate providers having a high conversion rate higher than those providers having a low (or non-existent) conversion rate.

Additionally, the provider referral system 110 considers feedback provided by various users that have purchased the products of referred providers. For example, as will be described in further detail below, where the provider referral system 110 has referred a provider to a user and the user has followed up on the referral to purchase a product from the provider, the provider referral system 110 can enable the user to provide feedback about the user's experience with the referred provider. Where users have given positive feedback about their referral experience with a provider, the provider referral system 110 can rate that provider higher when determining future referrals for other users requesting referrals.

Accordingly, the provider referral system 110 considers a number of factors to score or otherwise rate identified providers for a particular user. In particular, as the above factors include ratings uniquely associated with the user 104 that composed the message 204, the provider referral system 110 determines providers to refer that are uniquely compatible with the user 104. In addition, because each user of the social networking system 108 has a unique combination of connections, user ratings, and profile information, the provider referral system 110 will rate identified providers differently for different users that request referrals via the social networking system 108. As such, the provider referral system 110 determines different providers to refer to different users that are uniquely compatible with the different users.

Figure 2C:
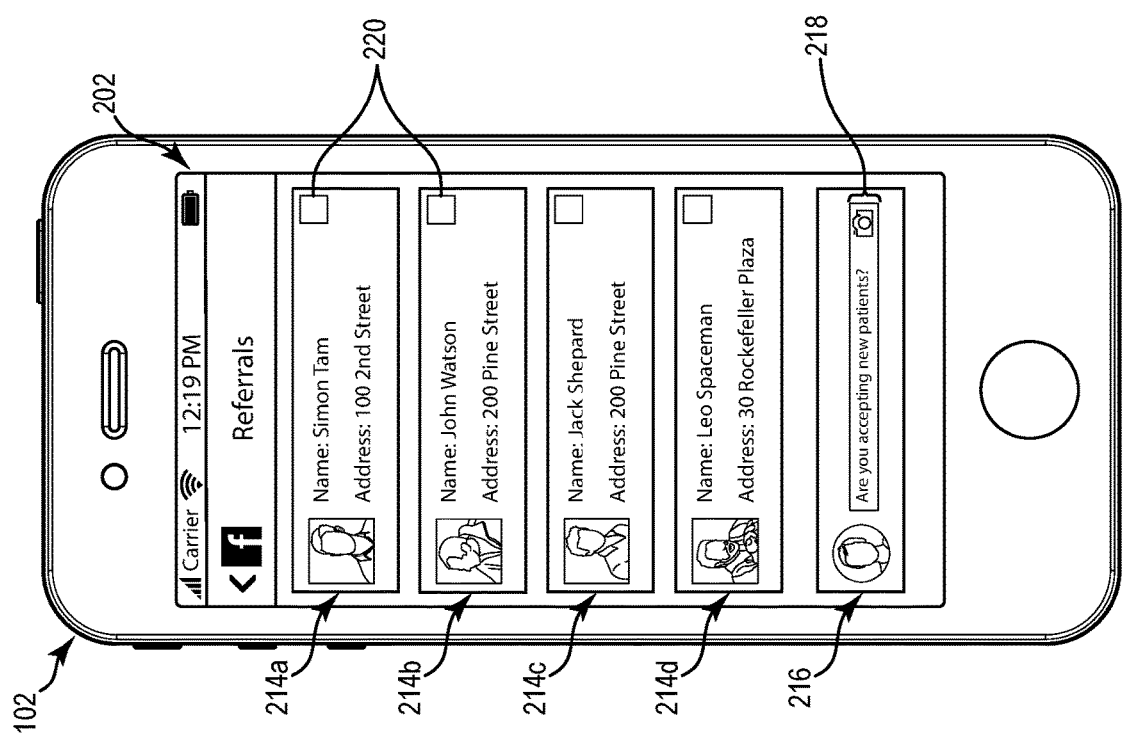
FIG. 2C illustrates an example graphical user interface including an example listing of referred providers in accordance with one or more embodiments.

Upon rating the identified providers and determining which of the providers to refer to the user 104, the provider referral system 110 causes the client device 102 to list a number of referred providers via a graphical user interface on the client device 102. For example, as shown in FIG. 2C, the display 202 of the client device 102 includes a listing of highly rated referrals 214a-d for providers of the product via a graphical user interface of the social networking system 108. In particular, as shown in FIG. 2C, the listing includes rated referrals 214a-d of doctors to refer to the user 104. As illustrated in FIG. 2C, the listing includes a first referral 214a ("Simon Tam"). As further illustrated, the listing includes a second referral 214b ("John Watson"). The listing further includes a third doctor 214c ("Jack Shepard"). The listing further includes a fourth doctor 214d ("Leo Spaceman"). The listing can include fewer or additional providers. Additionally, as shown in FIG. 2C, the listing of referrals can include associated addresses or other information (e.g., contact information) associated with the respective providers.

In one or more embodiments, the listing of referrals represents a listing of the highest rated providers identified by the provider referral system 110. In particular, the listing of referrals illustrated in FIG. 2C includes the top four rated doctors 214a-d based on factors associated with the user 104, factors associated with other users (e.g., friends, experts, message recipients) of the social networking system 108, and/or factors associated with the identified doctors 214a-c (or businesses associated with respective doctors). In one or more embodiments, rather than providing a listing of individuals (e.g., doctors) that provide a particular product, the provider referral system 110 provides a listing of businesses associated with individuals. For example, rather than providing a listing of the doctors 214a-d, the provider referral system 110 can provide a listing of businesses, practices, or clinics associated with the respective doctors 214a-d.

As shown in FIG. 2C, the provider referral system 110 can further provide a messaging option 216 for a user 104 to contact one or more of the listed referrals. For example, as shown in FIG. 2C, the displayed graphical user interface includes a messaging option 216 that enables the user 104 to send a message 218 to the referred doctors 214a-d. In one or more embodiments, the user 104 composes the message 218 to send to the providers. Alternatively, in one or more embodiments, the user 104 selects a pre-written or recommended message to send to the referred providers.

In one or more embodiments, the user 104 sends the message 218 to request additional information. For example, as shown in FIG. 2C, the message 218 reads "Are you accepting new patients?" thus inquiring about the availability of the referred doctors 214a-d. It is appreciated that the message 218 can include any message inquiring about availability, pricing, location (e.g., directions), or any message asking for information from the referred providers. In one or more embodiments, this message 218 is sent to each of the listed doctors 214a-d. For example, the provider referral system 110 can send a direct message via the social networking system to accounts (e.g., social networking accounts) associated with each of the referred providers. As another example, the provider referral system 110 can send emails, text messages, or other messages to the referred providers using various communication platforms. For instance, where a provider's profile (e.g., social networking profile) includes an email, phone number, or other address for communicating with the provider, the provider referral system 110 can utilize one or more of the listed communication methods for communicating with the referred provider(s).

In one or more embodiments, the user 104 can select or deselect the referred providers. For example, as shown in FIG. 2C, each of the icons for the listed doctors 214a-d includes a de-selection box 220 that enables the user 104 to selectively remove one or more of the doctors 214a-d from the listing of providers. Thus, in one or more embodiments, the user 104 deselects the first and second doctors 214a-b and sends the message 218 to the third and fourth doctors 214c-d. Alternatively, in one or more embodiments, the list may default to unselected for each of the referred providers and only send the message 218 to those referrals that the user 104 selects.

In one or more embodiments, de-selecting one of the referred providers causes a new referral to appear in the listing of referrals. For example, where the listing of referred doctors 214a-d represents the top four rated doctors for the user 104, de-selecting the first doctor 214a would remove the first doctor 214a from the listing to be replaced by a new doctor (e.g., the fifth rated doctor) not previously listed. Thus, the message 218 requesting additional information would be sent to the second doctor 214b, the third doctor 214c, the fourth doctor 214d, and a fifth doctor that replaces the removed first doctor 214a.

In one or more embodiments, the option 216 for communicating with the listed referrals enables the user 104 to simultaneously message each of the referred providers. For example, the provider referral system 110 would simultaneously send the same message 218 to each of the referred providers. Alternatively, in one or more embodiments, the provider referral system 110 enables the user 104 to send individual messages to the listed providers. For example, where FIG. 2C lists a single option 216 to communicate with all of the listed providers simultaneously, the provider referral system 110 can cause the client device 102 to list separate messaging options for each of the referred providers that enable the user 104 to individually message one or more referred providers.

As described above, the provider referral system 110 can identify, rate, and refer the highly rated providers to the user 104 based on an analysis of criteria for the providers and user 104. In addition, the provider referral system 110 can enable other users of the social networking system 108 (e.g., recipients of the message 204) to provide one or more additional referrals (e.g., user referrals) to the user 104 (e.g., other than the rated referrals). To illustrate, FIG. 3A illustrates a client device 102 including a display 202 that provide a graphical user interface including a message 204 and text 206 similar to the graphical user interface described above in connection with FIG. 2A. Additionally, as shown in FIG. 3A, the graphical user interface includes a comment 302 from a recipient of the message 204. For example, as illustrated in FIG. 3A, a recipient of the message 204 posts "We've been using Nick Riviera, and he's great!" In one or more embodiments, the provider referral system 110 analyzes the text of the comment 302 and identifies a user referral for a provider of a product.

In addition to the user referrals and the rated referrals identified by the provider referral system 110 based on analyzed factors for the user 104, the provider referral system 110 can further identify and provide one or more sponsored referrals to the user 104. For example, in one or more embodiments, providers can grow their business by paying for the provider referral system 110 to provide referrals for the provider to users of the social networking system 108 that post messages requesting referrals. Thus, when providing a listing of providers, the provider referral system 110 can include one or more sponsored referrals in addition to user referrals and/or rated referrals determined by the provider referral system 110.

For example, as shown in FIG. 3B, the provider referral system 110 causes the client device 102 to provide a listing of providers including a sponsored referral 306, a user referral 308 and rated referrals 214a-b identified by the provider referral system 110. In particular, the graphical user interface shown in FIG. 3B illustrates a sponsored referral 306 for a doctor ("John Dorian"). In addition, the graphical user interface illustrates the user referral for the doctor ("Nick Riviera") referred by the recipient of the message 204 in the comment 302 to the message 204 shown in FIG. 3A. In addition, the provider referral system 110 further includes one or more rated referrals 214a-b representing two providers representative of the two highest rated providers identified by the provider referral system 110. In particular, a first ranked referral 214a and a second ranked referral 214b represent the two highest rated providers identified by the provider referral system 110 based on the analysis of various factors associated with the user 104, other users of the social networking system 108, and/or factors associated with identified providers.

In one or more embodiments, the provider referral system 110 provides a messaging option 310 for the user 104 to contact each of the referred providers. For example, as shown in FIG. 3B, the graphical user interface includes a messaging option 310 for the user 104 to compose, select, or otherwise generate a message 312 to send to one or more of the referred providers. In one or more embodiments, the user 104 sends the message 314 to each of the referred providers simultaneously. Alternatively, in one or more embodiments, the user 104 selects or deselects users to define a subset of the referred providers to whom the message 314 is sent.

Figure 4:
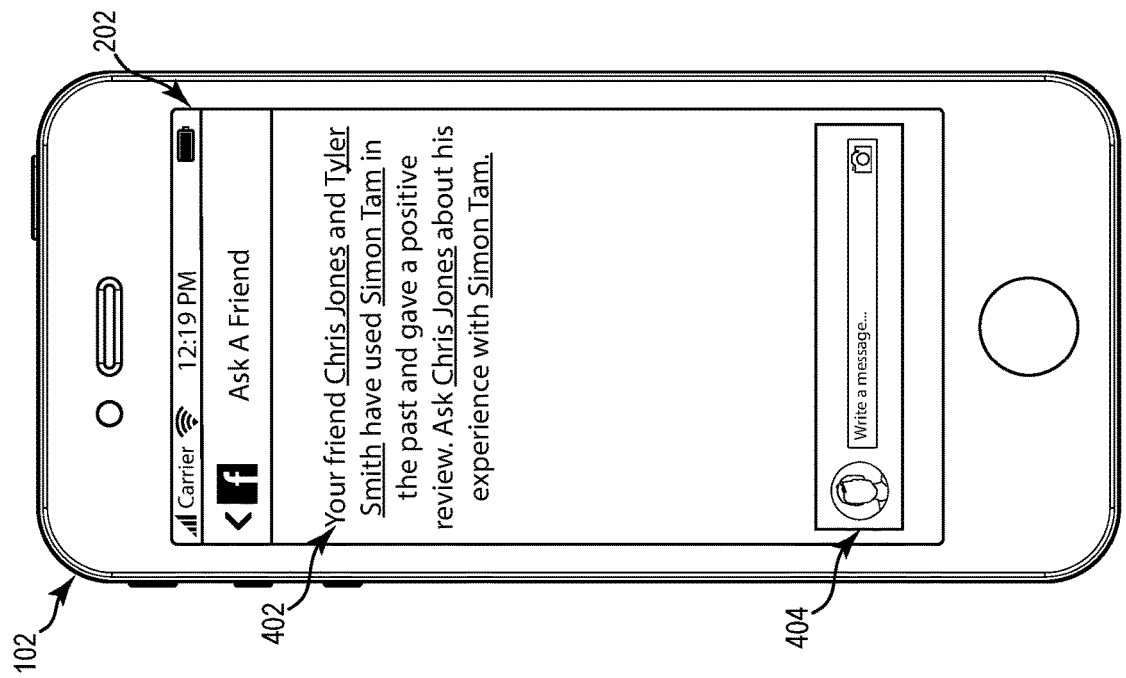
FIG. 4 illustrates an example graphical user interface including an option for a user to communicate with another user of the social networking system in accordance with one or more embodiments.

In one or more embodiments, the provider referral system 110 further enables a user 104 to communicate directly with one or more users of the social networking system 108 to inquire about a particular referral. For example, the graphical user interface of the client device 102 can provide a message 402 including an indication of one or more other users of the social networking system 108 that have purchased goods or services from a provider. As shown in FIG. 4, the graphical user interface includes a message 402 to the user 104 including an indication of multiple users ("Chris Jones" and "Tyler Smith") that have frequented "Simon Tam" and have given a favorable review. It is appreciated that the provider referral system 110 can further provide one or more users that have given negative reviews, thus giving the user 104 a chance to fully more thoroughly research a referred provider.

As shown in FIG. 4, the provider referral system 110 provides a message 402 of listing of one or more users of the social networking system 108 that have purchased a product from one of the referred providers. In one or more embodiments, the provider referral system 110 selects the top rated referral and provides a listing of one or more users of the social networking system 108 that have used the top rated referral at some point in the past. Alternatively, in one or more embodiments, the provider referral system 110 enables a user 104 select one of the referred providers and provides a listing of users (e.g., friends) that have received the referred provider's product in the past.

The provider referral system 110 can further enable the user 104 to communicate with one or more of the listed users that have a previous relationship (e.g., have purchased a product or "liked") with a referred provider. For example, as shown in FIG. 4, the provider referral system 110 provides a messaging option 404 for the user 104 to message each of the identified friends. In one or more embodiments, the messaging option 404 enables the user 104 to simultaneously message both of the listed friends. Additionally, in one or more embodiments, the messaging option 404 enables the user 104 to select a pre-composed message or compose a new message to send to one of the users indicated by the message 402.

In one or more embodiments, the provider referral system 110 identifies one or more friends having similar preferences as the user 104 (or with whom the user 104 frequently communicates via the social networking system 108) and indicates a provider that the friend(s) have used in the past. For example, where the user 104 and a friend on the social networking system 108 are at a similar location and have a lot of similar preferences on respective user profiles, the provider referral system 110 can identify that the friend has given a positive review for one of the referred providers and provide the message 402 indicating the friend-provider relationship as well as the messaging option 404 to enable the user 104 to further inquire the friend about the referred provider.

Figure 5B:
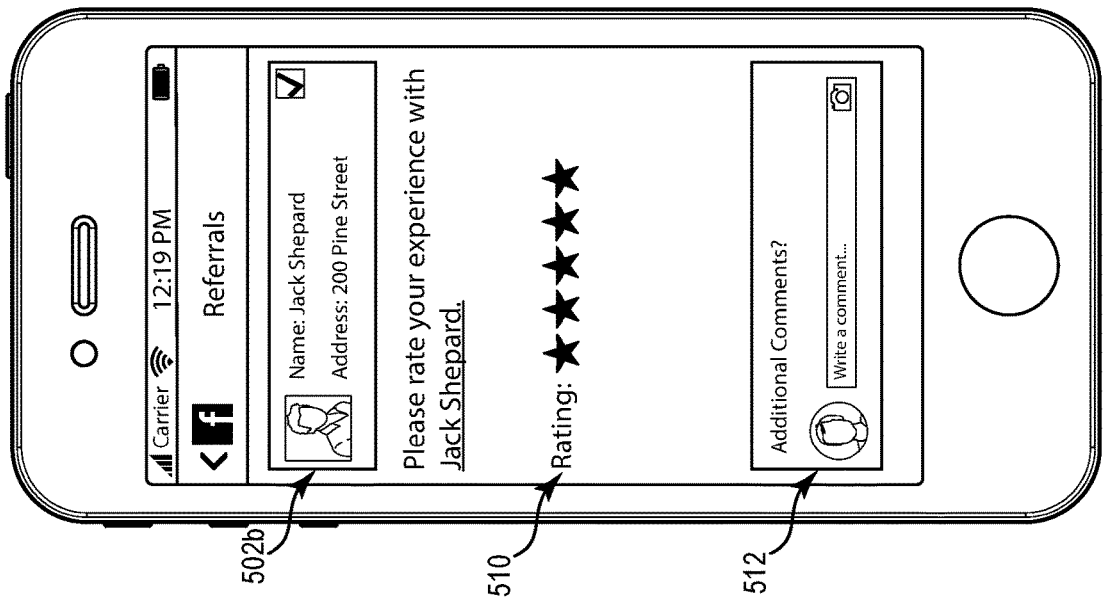
FIG. 5B illustrates an example graphical user interface including an option for a user to provide feedback for an identified provider in accordance with one or more embodiments.
Figure 5A:
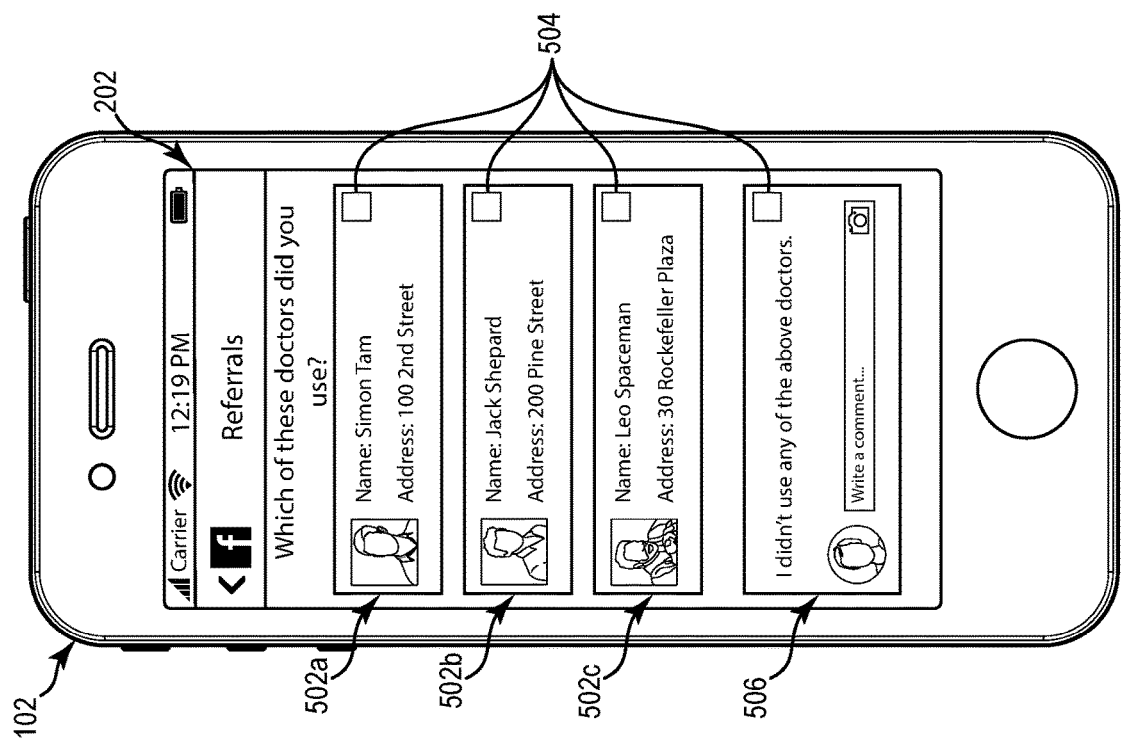
FIG. 5A illustrates an example graphical user interface including an option for a user to identify a provider of a product in accordance with one or more embodiments.

In addition, after a defined period of time has passed (or upon determining that the user 104 has purchased a product from a referred provider), the provider referral system 110 further enables the user 104 to provide feedback for the provider that the user 104 ultimately chose to use. For example, as shown in FIG. 5A, the provider referral system 110 provides a listing of one or more of the referred providers 502a-c and selectable options 504 to indicate which of the referred providers 502a-c (Or none of the referred providers 502a-c) the user 104 ultimately chose. In addition, where the user 104 chose none of the referred providers 502a-c, the provider referral system 110 can further provide a comment option 506 that enables the user 104 to identify a provider that the user 104 ultimately chose.

In one or more embodiments, the listing includes all of the referred providers. For example, the provider referral system 110 can provide a listing of any number of sponsored providers, user-referred providers, and/or rated providers identified by the provider referral system 110 based on various factors.

Alternatively, in one or more embodiments, the provider referral system 110 provides a listing of a subset of the referred providers without providing all of the referred providers. For example, in one or more embodiments, the provider referral system 110 identifies each of the referred providers that receives a message from the user 104 requesting additional information. Alternatively, in one or more embodiments, the provider referral system 110 identifies each of the referred providers that respond to the message from the user 104. In particular, the provider referral system 110 can detect or otherwise identify which of the referred providers responded to the message that was simultaneously or individually delivered from the user 104 to one or more of the referred providers in response to receiving the listing of referred providers.

As shown in FIG. 5A, the user 104 can select a provider that the user 104 ultimately chose to use. In response, the provider referral system 110 can enable the user 104 to provide feedback for the user's experience with the provider. For example, where the user 104 chose to ultimate engage the services of the second referred user 502b of FIG. 5A, the provider referral system 110 can cause the client device 102 to provide a rating option 510 for the user 104 to rate the provider. As shown in FIG. 5B, the user 104 can rate the provider on a five-star scale. Additionally, as shown in FIG. 5B, the provider referral system 110 can further cause the client device 102 to provide a messaging option 512 that enables the user 104 to provide additional feedback about the experience with the selected referred provider 502b.

In addition to enabling the user 104 to select or otherwise identify a provider that the user 104 chose to user, the provider referral system 110 can automatically determine which of the referred providers the user 104 chose to use without receiving a selection from the user 104. For example, the provider referral system 110 can identify that the user 104 used a referred provider based on location information of a check-in or by identifying a message from the user 104 to a friend (e.g., a recipient that referred a provider) that indicates the user 104 used a referred provider. In one or more embodiments, the provider referral system 110 tentatively identifies that the user 104 used the referred provider (e.g., without receiving a user input identifying the provider), but confirms (e.g., via a follow up prompt or message) that the user 104 used the referred provider.

As mentioned above, the provider referral system 110 can utilize the feedback provided by the user 104 in providing future referrals of the referred provider 502b to other users of the social networking system 108. For example, where a friend of the user 104 requests a referral for a doctor, the provider referral system 110 can rate the referred doctor 502b higher than other identified doctors based on a five-star feedback received from the user 104. Similarly, the provider referral system 110 can rate the referred doctor 502b lower than other identified doctors based on a one-star feedback and/or a negative comment received from the user 104.

Figure 6:
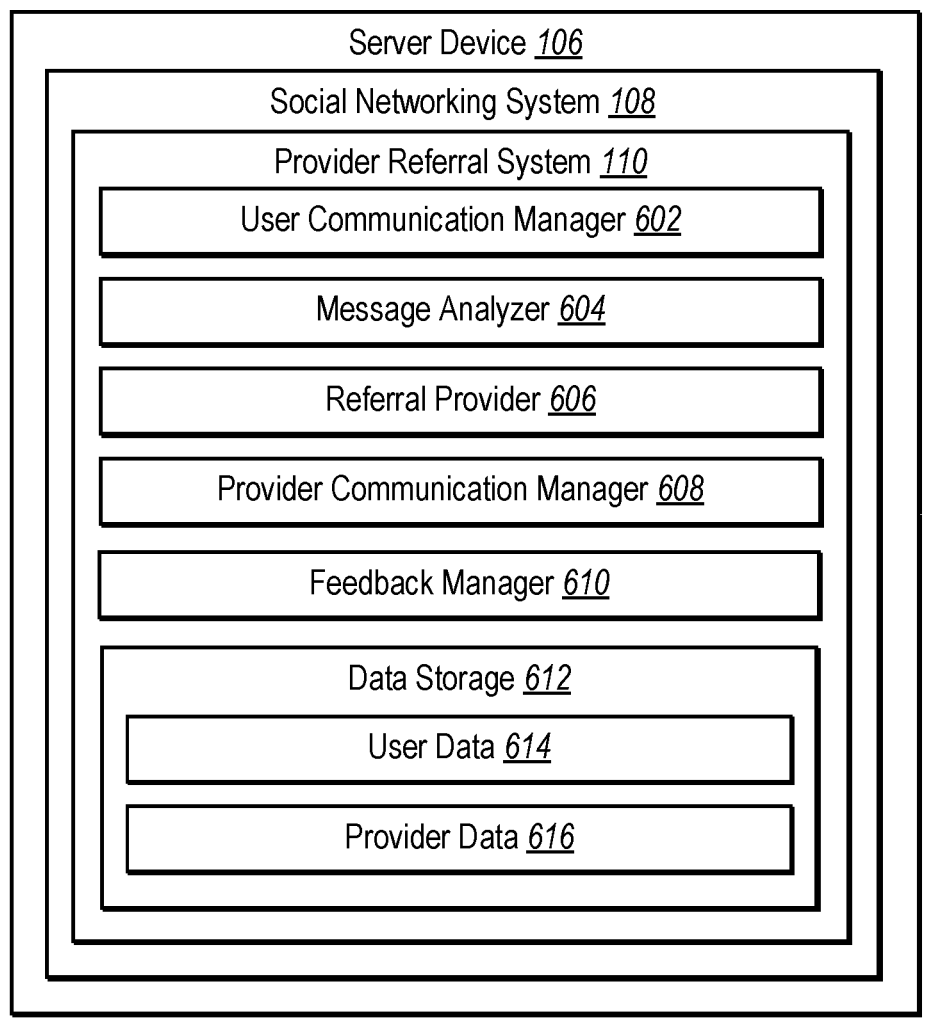
FIG. 6 illustrates a block diagram of a provider referral system in accordance with one or more embodiments.

Turning now to FIG. 6, additional detail will be provided regarding components and capabilities of an example architecture for the provider referral system 110 that may be implemented on the server device 106 in accordance with one or more embodiments. In particular, FIG. 6 illustrates an embodiment of an exemplary provider referral system 110 that accomplishes features and functionality associated with one or more embodiments described above. For example, the provider referral system 110 identifies an intent of a user 104 to solicit referrals from other users of a social networking system 108 and provides one or more referrals to the user 104 based on various factors.

As shown in FIG. 6, the provider referral system 110 includes a user communication manager 602, a message analyzer 604, a referral provider 606, a provider communication manager 608, a feedback manager 610, and a data storage 612 including, for example, user data 614 and provider data 616.

As illustrated in FIG. 6, the provider referral system 110 includes a user communication manager 602. In particular, the user communication manager 602 facilitates communication between users of the social networking system 108. For example, the user communication manager 602 enables users to communicate directly with other individual users of the social networking system 108. Additionally, users can message multiple users via direct message or by posting messages to a group, page, newsfeed, or other virtual space accessible to a defined group of users. In one or more embodiments, the user communication manager 602 enables a user 104 to post messages accessible to any contacts or friends of the user. For example, similar to one or more embodiments described above, the user communication manager 602 enables a user 104 to post a message 204 asking for referrals of a provider of a product from friends of the user 104 (or other recipients of the message 204) on the social networking system 108.

As further illustrated in FIG. 6, the provider referral system 110 includes a message analyzer 604. In particular, the message analyzer 604 analyzes a message 204 from the user 104 to determine that the user 104 intends to solicit requests for referrals of a provider of a product from recipients of the message 204. In one or more embodiments, the message analyzer 604 analyzes the text 206 of the message 204 using natural language processing and/or key word analysis to determine the intent of the user 104 to solicit referrals. As an example, and as described in one or more embodiments herein, the message analyzer 604 can analyze a message 204 including text 206 that reads "Hey! Does anyone know any good doctors?" to determine that the user 104 is requesting referrals of a doctor from recipients of the message 204.

Additionally, in one or more embodiments, the message analyzer 604 further analyzes comments or responses to the message 204 to determine that the user 104 is requesting referrals for providers of a product. For instance, the message analyzer 604 can utilize a similar natural language process and/or key word analysis to determine or confirm that the message 204 includes a request for referrals of a provider of a product. As an example, where one or more responses or comments to the message 204 include one or more user referrals of providers, the message analyzer 604 can determine or confirm that the message 204 included a request for referrals.

Moreover, in one or more embodiments, the message analyzer 604 can analyze comments to further determine details associated with the request for referrals. In particular, the message analyzer 604 can determine that the user 104 is interested in receiving referrals for nearby providers or providers of a specific type. For example, as described above, where the message 204 reads "Hey! Does anyone know any good doctors?," the message analyzer 604 can determine that the user 104 is interested in receiving referrals for doctors. Additionally, where a recipient of the message 204 responds with a comment 208a that reads "What kind of doctor?" to which the user 104 responds with another comment 208b that reads "Just a nearby family doctor", the message analyzer 604 can determine (based additionally on the comments 208a-b) that the user 104 is specifically interested in receiving referrals for family doctors rather than other types of doctors.

As further shown in FIG. 6, the provider referral system 110 includes a referral provider 606 that facilitates providing referred providers to the user 104. In particular, in response to determining that the user 104 is interested in receiving referrals for providers of a product, the referral provider 606 can identify any number of providers that provider the product. For example, the referral provider 606 can identify any providers known to the social networking system 108 within a threshold distance or within a similar locale as the user 104. In one or more embodiments, the referral provider 606 identifies any providers of the product known to the social networking system 108.

Upon identifying any number of providers, the referral provider 606 further rates the identified providers to determine which of the providers to refer to the user 104. For example, as described in one or more embodiments herein, the referral provider 606 can analyze various factors to determine a rating of the identified providers. In particular, the referral provider 606 can analyze information (e.g., profile information) associated with the user 104 requesting the referrals. Additionally, the referral provider 606 can analyze information associated with other users of the social networking system 108 including, for example, friends of the user 104, recipients of the message 204, identified experts associated with the providers, product, or relevant industry, other local users, or other general users of the social networking system 108. Further, the referral provider 606 can analyze information associated with the identified providers including, for example, activity of the providers on the social networking system 108, a history of the identified providers with the user 104 or friends of the user 104, and other information associated with the identified providers.

The referral provider 606 can utilize the various combinations of factors associated with the user 104, other users, and/or providers to determine which of the identified providers have the highest rating for the user 104 requesting referrals. Further, the referral provider 606 can provide a listing of the highest rated referrals to the user 104. In particular, the referral provider 606 can provide the listing of providers (e.g., highest rated providers) to a client device 102 for display to the user 104. As an example, and as shown above in connection with FIG. 2C, the referral provider 606 can cause the client device 102 to present a listing of referred providers 214a-d representative of the highest rated providers identified by the referral provider 606.

In addition to providing the highest rated providers, the referral provider 606 can further provide a listing of other referred providers to the user 104. For example, in one or more embodiments, the referral provider 606 identifies one or more sponsored providers and provides a listing of referred providers including one or more sponsored providers as well as one or more rated providers. As another example, in one or more embodiments, the referral provider 606 identifies one or more user referrals provided via the comments to the message 204 from recipients of the message 204. Thus, the referral provider 606 can provide a listing of referred providers that includes one or more user-referred providers as well as the rated providers. Further, the referral provider 606 can provide a listing that includes one or more sponsored providers, user-referred providers, and rated providers.

As further illustrated in FIG. 6, the provider referral system 110 includes a provider communication manager 608 that facilitates communication between the user 104 one or more referred providers. For example, in one or more embodiments, the provider communication manager 608 enables the user 104 to simultaneously message one or more of the referred providers. For example, as described above, in one or more embodiments, the provider communication manager 608 provides a messaging option 216 to select or compose a message 218 to send to each of a plurality of referred providers 214*a-d* presented via a graphical user interface on the client device 102. In one or more embodiments, the provider communication manager 608 can select or deselect one or more of the referred providers to remove or add one or more providers as recipients of the message 218.

As described above, in one or more embodiments, the provider communication manager 608 enables the user 104 to simultaneously message each of multiple referred providers. For example, the user 104 can compose a message and the provider communication manager 608 provides the message to each of the referred providers. In one or more embodiments, the provider communication manager 608 provides individual copies of the message within individual messaging threads and maintains messaging threads between the user 104 and each of the providers that received the simultaneously distributed message. Alternatively, in one or more embodiments, the provider communication manager 608 can individually message each of the referred providers. For example, in one or more embodiments, the provider communication manager 608 provides a messaging option for each of the referred providers that enables the user 104 to select or compose individual messages to send to each of the referred providers.

In one or more embodiments, the provider communication manager 608 specifically enables the user 104 to send messages to the referred providers via the social networking system 108. For example, the user 104 can send a direct message or post on a page of the referred providers via a communication platform provided by the social networking system 108. Alternatively, in one or more embodiments, the provider communication manager 608 enables the user 104 to communicate with the referred providers using different communication platforms (e.g., text, email). For example, where a provider has an email or phone number listed on a social networking profile, the provider communication manager 608 can enable the user 104 to utilize one or more of the alternative communication platforms to communicate with the referred providers, either individually or simultaneously. For example, in one or more embodiments, the provider communication manager 608 can simultaneously send a message to multiple providers using different communication platforms for the respective referred providers.

As further shown in FIG. 6, the provider referral system 110 includes a feedback manager 610 that enables a user 104 to leave feedback for an experience with one or more of the referred providers. For example, where a user 104 eventually purchases a product from one of the referred providers, the feedback manager 610 can provide an interface that enables the user 104 to leave feedback indicating a positive or negative experience. In one or more embodiments, the provider referral system 110 uses the feedback to analyze and recommend providers to other users of the social networking system 108 requesting referrals.

As further shown in FIG. 6, the provider referral system 110 includes a data storage 612. As further shown, the data storage 612 includes user data 614. In particular, the user data 614 includes any information associated with users of the social networking system 108. For example, the user data 614 can include profile information, preferences, associations, contacts, or other information provided by users to the social networking system 108. Additionally, the user data 614 can include information associated with comments, messages, purchases, feedback, or other interactions between users of the social networking system 108. As described above, the provider referral system 110 can utilize the user data 614 to identify and rate providers to refer to a user 104 requesting referrals from other users of the social networking system 108.

As further shown in FIG. 6, the data storage 612 includes provider data 616. In particular, the provider data 616 includes any information associated with one or more providers of products. For example, where a provider has a profile, account, page, or group on the social networking system 108, the provider data 616 can include profile information, preferences, associations, contacts, and other information associated with the provider's account. Additionally, provider data 616 can include a history of interactions between the provider and various users of the social networking system 108. For example, the provider data 616 can include information associated with posts, messages, comments, and other interactions of the provider with the social networking community.

Each of the components 602-612 of the provider referral system 110 and corresponding elements may be in communication with one another using any suitable communication technologies. It will be recognized that although components 602-612 and their corresponding elements are shown to be separate in FIG. 6, any of the components 602-612 and their corresponding elements may be combined into fewer components, such as into a single facility or module, divided into more components, or configured into different components as may serve a particular embodiments.

The components 602-612 and their corresponding element can comprise software, hardware, or both. For example, the components 602-612 and their corresponding elements can comprise one or more instructions stored on a computer-readable storage medium and executable by processors of one or more computing devices. When executed by the one or more processors, the computer-executable instructions of the provider referral system 110 can cause a client device and/or a server device to perform the methods described herein. Alternatively, the components 602-612 and their corresponding elements can comprise hardware, such as a special purpose processing device to perform a certain function or group of functions. Additionally, the components 602-612 and their corresponding elements can comprise a combination of computer-executable instructions and hardware.

Furthermore, one or more components 602-612 of the provider referral system 110 may, for example, be implemented as one or more stand-alone applications, as one or more modules of an application, as one or more plug-ins, as one or more library functions or functions that may be called by other applications, and/or as a cloud-computing model. Thus, one or more of the components 602-612 of the provider referral system 110 may be implemented as a stand-alone application, such as a desktop or mobile application. Furthermore, one or more components 602-612 of the the provider referral system 110 may be implemented as one or more web-based applications hosted on a remote server.

FIGS. 1-6, the corresponding text, and the examples, provide a number of different systems and devices that enable a provider referral system 110 to provide referrals for providers of a product to users of a social networking system 108 and enable the users to communicate with the provided referrals. In addition to the foregoing, embodiments can also be described in terms of flowcharts comprising acts and steps in a method for accomplishing a particular result. For example, FIG. 7 illustrates a flowchart of an exemplary method in accordance with one or more embodiments.

Figure 7:
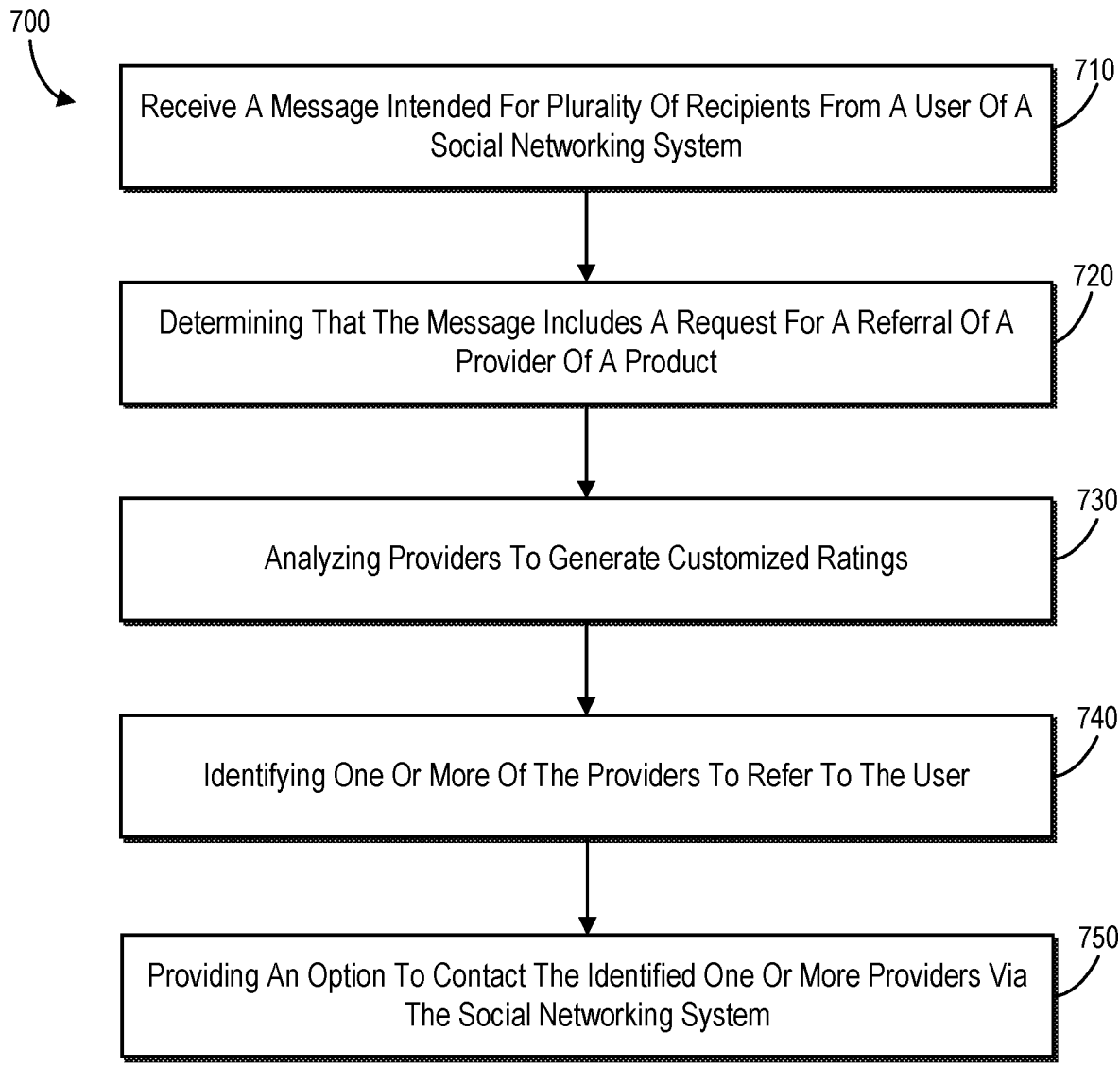
FIG. 7 illustrates a flow diagram of a method for providing a referral for a provider of a product in accordance with one or more embodiments.

FIG. 7 illustrates a flowchart of one example method 700 for providing referred providers to a user 104 of a social networking system 108. The method 700 includes an act 710 of receiving a message 204 intended for a plurality of recipients from a user 104 of a social networking system 108. For example, in one or more embodiments, the act 710 involves receiving, from a user 104 of a social networking system 108, a message 204 intended for a plurality of recipients, the plurality of recipients including a plurality of users of the social networking system 108 associated with the user 104. In one or more embodiments, receiving the message 204 includes receiving a message 204 intended for friends of the user 104, a defined group of users on the social networking system 108 or general users of the social networking system 108. As an example, receiving the message 204 can include receiving a post by the user 104 to a profile accessible to friends of the user. In one or more embodiments, the method 700 further involves posting the message for access to a number of users (e.g., recipients) of the social networking system 108.

As shown in FIG. 7, the method 700 further includes an act 720 of determining that the message 204 includes a request for a referral of a provider of a product. For example, in one or more embodiments, the act 720 involves determining, by at least one processor, that the message 204 comprises a request for a referral of a provider of a product. In one or more embodiments, determining that the message 204 includes a request for referrals involves performing a natural language analysis or a key word analysis of text 206 of the message 204 to determine that the message 204 includes a request for referrals from the recipients of the message 204.

As shown in FIG. 7, the method 700 further includes an act 730 of analyzing providers of the product to generate customized ratings. For example, in one or more embodiments, the act 730 involves analyzing a plurality of providers of the product to generate customized ratings of the plurality of providers to the user 104. In one or more embodiments, analyzing the providers includes determining the referral ratings for the plurality of providers used for identifying the one or more providers to refer to the user 104. For example, in one or more embodiments, analyzing the providers determining referral ratings based on a relationship on the social networking system 108 between the user 104 and each of the plurality of providers. For example, the social networking system 108 can consider whether a user has liked, visited, or messaged one or more of the plurality of providers in determining a referral rating for the user 104.

Additionally, in one or more embodiments, analyzing the providers includes determining referral ratings based on a relationship on the social networking system between one or more of the plurality of recipients of the message and each of the plurality of providers. For example, social networking system 108 can consider whether recipients of the message 204 (e.g., friends of the user 104) have liked, visited, or messaged one or more of the plurality of providers in determining a referral rating for the user 104.

Additionally, in one or more embodiments, analyzing the providers includes determining referral ratings based on a level of activity for each of the plurality of providers with users of the social networking system 108. For example, determining the referral can involve determining a frequency that each of the plurality of providers have communicate with users of the social networking system 108. As a further example, determining the referral can involve determining a recency that each of the plurality of providers have communicated with users of the social networking system.

As shown in FIG. 7, the method 700 further includes an act 740 of identifying one or more providers to refer to the user 104. For example, in one or more embodiments, the act 740 involves identifying, by the at least one processor, one or more providers to refer to the user 104 based on the customized ratings. In one or more embodiments, identifying the one or more providers involves identifying highly rated providers (e.g., providers having the highest customized rating) from a plurality of providers having a location nearby a location for the user 104 (e.g., a location indicated by a user profile for the user 104). In one or more embodiments, identifying one or more providers to refer to the user 104 involves identifying the highest rated providers from a number of providers having the highest customized rating.

As shown in FIG. 7, the method 700 further includes an act 750 of providing an option to contact the identified one or more providers via the social networking system 108. For example, in one or more embodiments, the act 750 involves providing, via a graphical user interface of the social networking system 108, an option to contact the identified one or more providers via the social networking system 108.

In one or more embodiments, providing the option involves providing an option (e.g., a selectable option) to send a message to the one or more providers via a communication platform provided by the social networking system 108. For example, in one or more embodiments, providing the option to send the message to the one or more providers involves providing, via the graphical user interface of the social networking system 108, a messaging interface that enables the user 104 to compose a message to simultaneously send to each of the identified one or more providers via the social networking system 108. Alternatively, in one or more embodiments, providing the option to send the message to the one or more providers involves providing an option (e.g., a selectable option) to send a message using a different communication platform (e.g., email, text) than a messaging platform provided by the social networking system 108.

In one or more embodiments, the method 700 further includes identifying one or more user-referred providers of the product from one or more comments to the message from one or more recipients of the plurality of recipients. Further, in one or more embodiments, providing the option to contact the identified one or more providers involves providing an option to contact the identified one or more user-referred providers of the product via the social networking system 108. For example, in one or more embodiments, providing the option to contact the identified one or more providers involves providing an option to simultaneously contact both the identified one or more providers and the one or more user-referred providers via the social networking system 108.

Further, in one or more embodiments, the method 700 involves identifying one or more sponsored providers of the product. Further, in one or more embodiments, providing the option to contact the identified one or more providers via the social networking system 108 involves providing an option to simultaneously contact the identified one or more providers and the one or more sponsored providers via the social networking system. Additionally, in one or more embodiments, the method involves providing an option to contact each of the identified one or more providers (e.g., rated providers), one or more user-referred providers, and one or more sponsored providers.

Moreover, in one or more embodiments, the method 700 involves determining that the user 104 has purchased a product from a first provider of the one or more providers. Further, the method 700 can involve providing, via the graphical user interface of the social networking system 108, an option for the user 104 to provide feedback associated with an experience of the user 104 with the first provider. Additionally, the method 700 can involve utilizing the feedback associated with the experience of the user 104 in identifying the first provider to refer to another user of the social networking system 108 that has requested referrals for a provider of the product.

Figure 8:
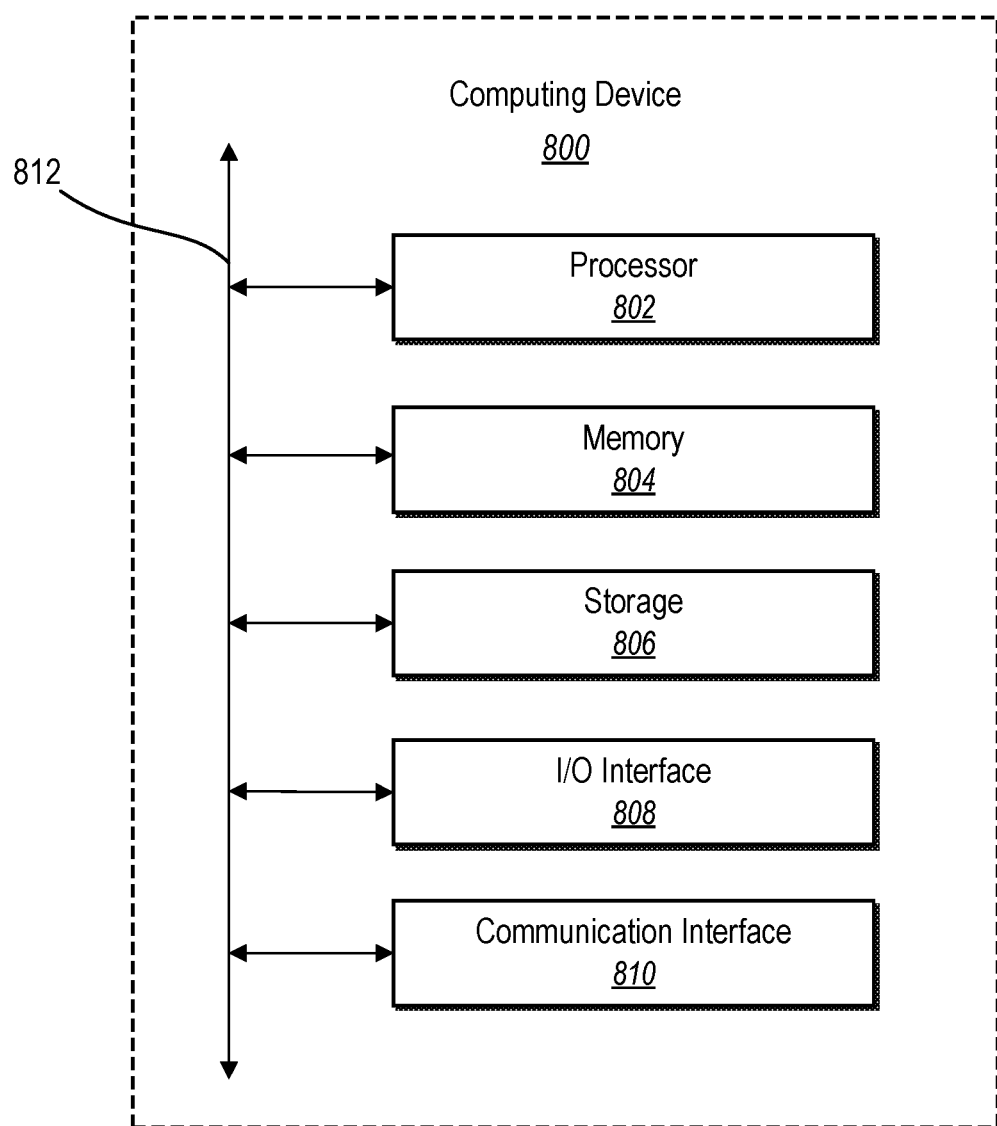
FIG. 8 illustrates a block diagram of an example computing device in accordance with one or more embodiments.

FIG. 8 illustrates, in block diagram form, an exemplary computing device 800 that may be configured to perform one or more of the processes described above. One will appreciate that the client device 102 and server device 106 each comprise one or more computing devices in accordance with implementations of computing device 800. As shown by FIG. 8, the computing device can comprise a processor 802, a memory 804, a storage device 806, an I/O interface 808, and a communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the provider referral system 110 may be linked to and/or implemented within a social-networking system (e.g., social networking system 108). A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 9:
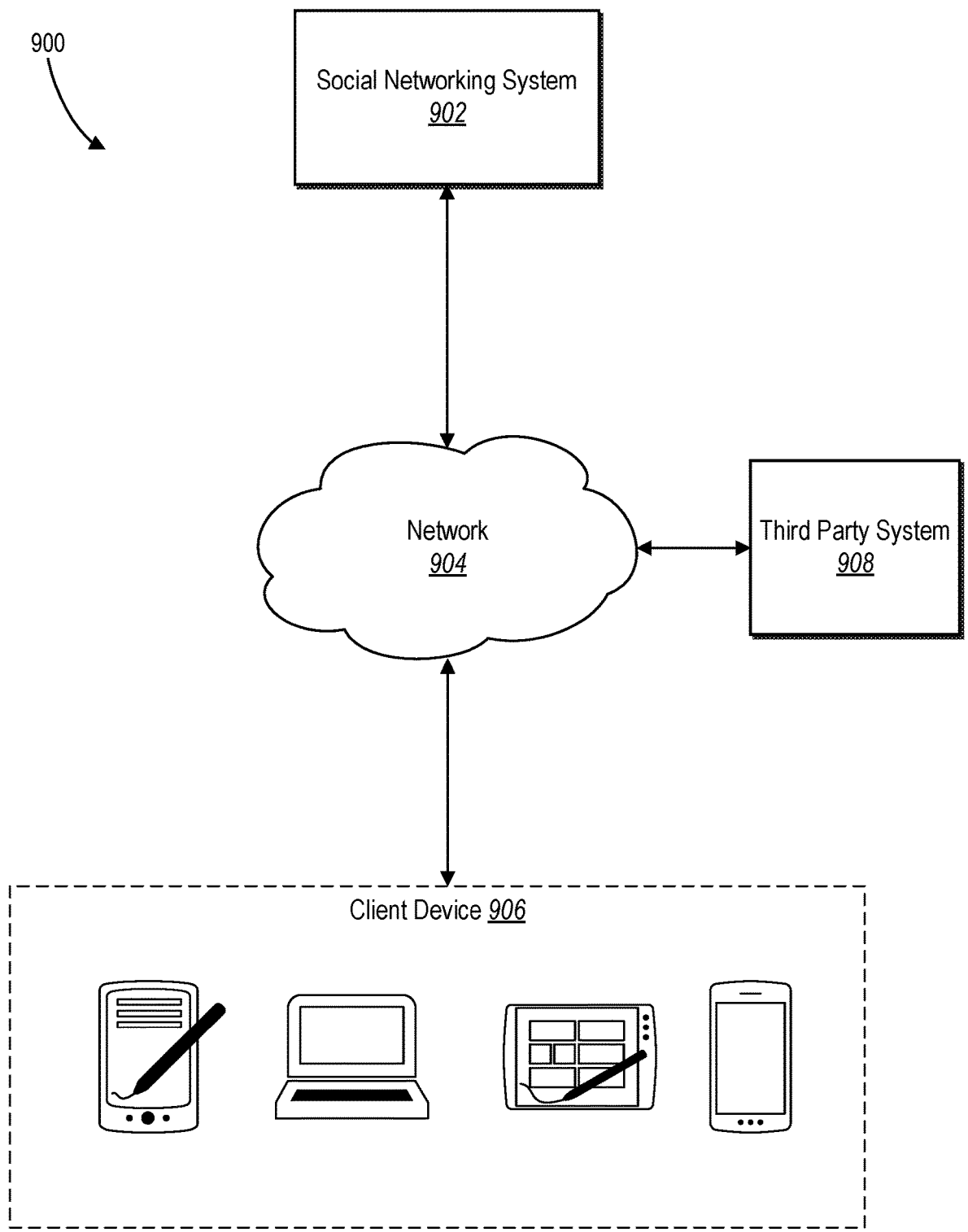
FIG. 9 illustrates an example network environment of a social networking system in accordance with one or more embodiments.

FIG. 9 illustrates an example network environment 900 of a social-networking system. In particular embodiments, a social-networking system 902 may comprise one or more data stores. In particular embodiments, the social-networking system 902 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 902 may comprise one or more computing devices (e.g., servers) hosting functionality directed to operation of the social-networking system 902. A user of the social-networking system 902 may access the social-networking system 902 using a client device such as client device 906. In particular embodiments, the client device 906 can interact with the social-networking system 902 through a network 904.

The client device 906 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access the social-networking system 902.

While these methods, systems, and user interfaces utilize both publicly available information as well as information provided by users of the social-networking system, all use of such information is to be explicitly subject to all privacy settings of the involved users and the privacy policy of the social-networking system as a whole.

Figure 10:
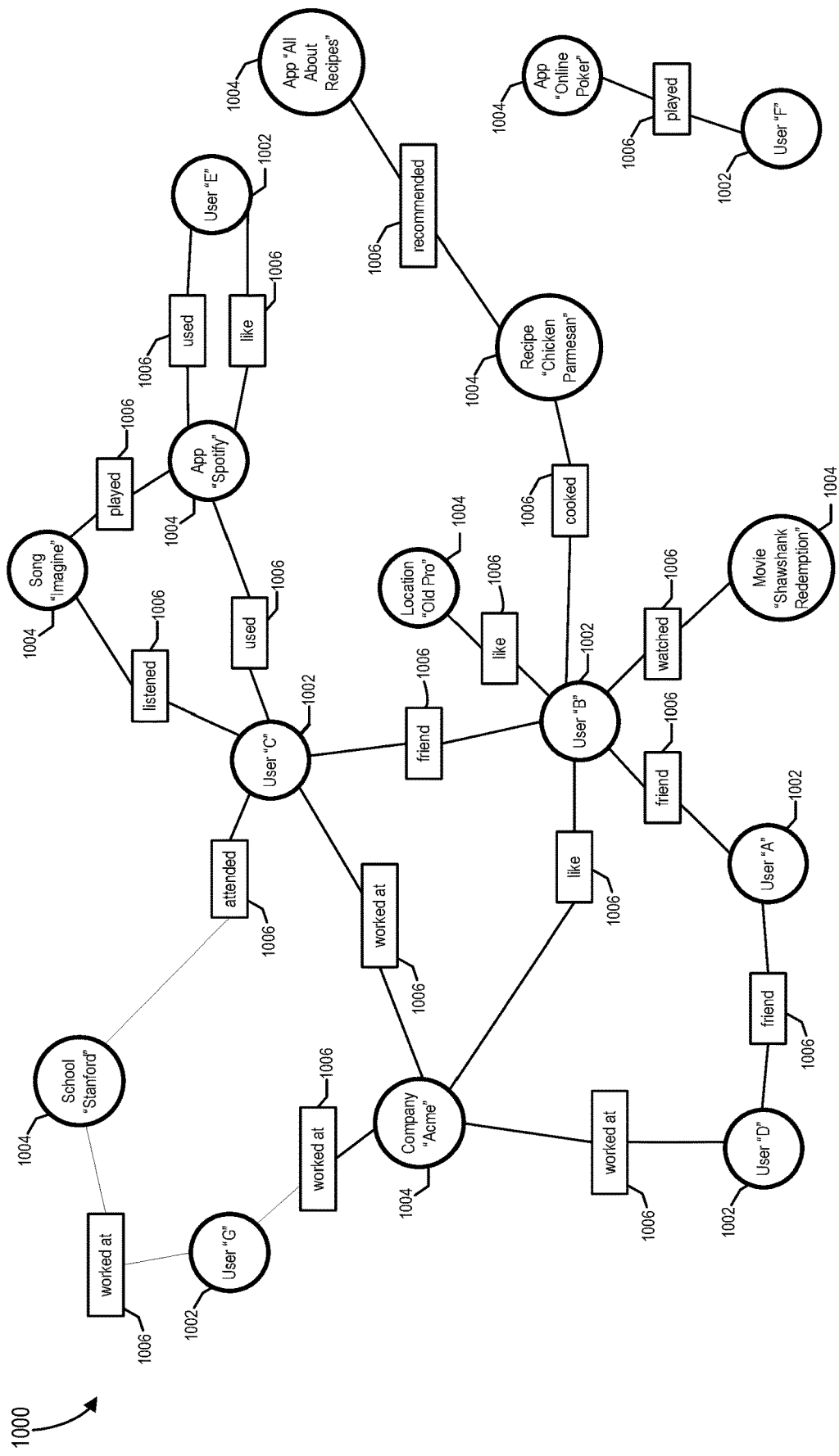
FIG. 10 illustrates a social graph in accordance with one or more embodiments.

FIG. 10 illustrates example social graph 1000. In particular embodiments, social networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social networking system 902, client system 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social networking system 902. As an example and not by way of limitation, a user may be an individual (human user), an entity (e.g., an enterprise, business, or third-party application), or a group (e.g., of individuals or entities) that interacts or communicates with or over social networking system 902. In particular embodiments, when a user registers for an account with social networking system 902, social networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social networking system 902. In particular embodiments, a user node 1002 may be associated with information provided by a user or information gathered by various systems, including social networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social networking system 902. Profile pages may also be hosted on third-party websites associated with a third-party server 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social networking system 902 a message indicating the user's action. In response to the message, social networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social networking system 902 may send a "friend request" to the second user. If the second user confirms the "friend request," social networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social networking system 902 a message indicating the user's liking of the concept associated with the concept-profile page. In response to the message, social networking system 902 may create an edge 1006 between user node 1002 associated with the user and concept node 1004, as illustrated by "like" edge 1006 between the user and concept node 1004. In particular embodiments, social networking system 902 may store an edge 1006 in one or more data stores. In particular embodiments, an edge 1006 may be automatically formed by social networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 902) or RSVP (e.g., through social networking system 902) to an event associated with the advertisement. In addition or as an alternative, an advertisement may include social-networking-system context directed to the user. As an example and not by way of limitation, an advertisement may display information about a friend of the user within social networking system 902 who has taken an action associated with the subject matter of the advertisement.

In particular embodiments, social networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 902 may calculate a coefficient based on a user's actions. Social networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 902 may analyze a user's actions to determine whether one or more of the actions indicate an affinity for subject matter, content, other users, and so forth. As an example and not by way of limitation, if a user may make frequently posts content related to "coffee" or variants thereof, social networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 902 may calculate a coefficient based on the type of relationship between particular objects. Referencing the social graph 1000, social networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 902 may determine that the user has a higher coefficient with respect to the first photo than the second photo because having a tagged-in-type relationship with content may be assigned a higher weight and/or rating than having a like-type relationship with content. In particular embodiments, social networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social networking system 902 may determine that the user has a higher coefficient for the airport than the gas station based on the proximity of the airport to the user.

In particular embodiments, social networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 902 may provide information that is relevant to user's interests and current circumstances, increasing the likelihood that they will find such information of interest. In particular embodiments, social networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social networking system 902 may calculate the coefficient (or access the coefficient information if it has previously been calculated and stored). In particular embodiments, social networking system 902 may measure an affinity with respect to a particular process. Different processes (both internal and external to the online social network) may request a coefficient for a particular object or set of objects. Social networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   receiving, from a client device associated with a user of a social networking system, a message intended for a plurality of users of the social networking system associated with the user;
   providing, for display on the client device, the message within a graphical user interface comprising a social networking newsfeed;
   determining, by at least one processor, that the message comprises a request for a referral of a provider of a product;
   providing, for display on the client device, a confirmation request embedded within the graphical user interface, the confirmation request querying the user to confirm that the message comprises the request for the referral;
   analyzing a plurality of providers of the product to generate customized ratings of the plurality of providers for the user;
   identifying, by the at least one processor, suggested providers to refer to the user based on the customized ratings; and
   based on receiving a confirmation from the user and identifying the suggested providers, generating for display on the client device, an additional graphical user interface comprising:
      an icon, identifying information, and an interactive element for each of one or more of the suggested providers, wherein each interactive element is selectable to identify the corresponding suggested provider as a recipient suggested provider; and
      a single interactive messaging element for the user to input an inquiry message to be sent simultaneously via the social networking system, to each recipient suggested provider.

2. The method of claim 1, further comprising:
   identifying the plurality of providers corresponding to a location nearby a location for the user; and
   identifying the suggested providers to refer to the user from the plurality of providers corresponding to the location nearby the location for the user.

3. The method of claim 1, wherein analyzing the plurality of providers of the product to generate the customized ratings comprises determining referral ratings for the plurality of providers based on a relationship within the social networking system between the user and each of the plurality of providers.

4. The method of claim 1, wherein analyzing the plurality of providers of the product to generate the customized ratings comprises determining referral ratings for the plurality of providers based on a relationship within the social networking system between a recipient of the message and each of the plurality of providers.

5. The method of claim 1, wherein analyzing the plurality of providers of the product to generate the customized ratings comprises determining referral ratings for the plurality of providers based on a level of activity for each of the plurality of providers with one or more users of the social networking system.

6. The method of claim 5, further comprising determining the level of activity by determining a frequency that each of the plurality of providers have communicated with the one or more users of the social networking system.

7. The method of claim 5, further comprising determining the level of activity by determining a recency that each of the plurality of providers have communicated with the one or more users of the social networking system.

8. The method of claim 1, further comprising:
   posting, via the social networking system, the message for access by the plurality of users; and
   identifying a user-referred provider of the product from a comment to the posted message from a user of the plurality of users.

9. The method of claim 1, further comprising identifying within the additional graphical user interface a first suggested provider as a sponsored provider of the product and a second suggested provider as a user-referred provider of the product.

10. The method of claim 1, further comprising:
    identifying a contact of the user within the social networking system who previously purchased the product from a suggested provider of the plurality of providers; and
    providing an indication for display on the client device that the contact previously purchased the product from the suggested provider.

11. The method of claim 1, wherein determining that the message comprises the request for the referral comprises applying natural language processing to the message to identify key words indicating an intent to solicit referrals.

12. The method of claim 1, further comprising:
    generating the additional graphical user interface further comprising a message option to simultaneously send the inquiry message to each recipient suggested provider;
    receiving an indication of a selection by the user of the message option; and
    simultaneously sending the inquiry message to each recipient suggested provider via the social networking system.

13. The method of claim 1, further comprising:
    determining that a period of time has elapsed since receiving the message comprising the request for the referral;

providing, via a further graphical user interface of the client device:
   an option for the user to provide feedback associated with an experience of the user with a suggested provider from the suggested providers; and
   an alternative option to identify a provider not among the suggested providers from whom the user purchased the product.

14. The method of claim 1, further comprising:
determining that the user has purchased the product from a first provider of the suggested providers;
providing, via a further graphical user interface, an option for the user to provide feedback associated with an experience of the user with the first provider; and
based on the feedback associated with the experience of the user with the first provider, generating a customized rating of the first provider for another user that is associated with the user via the social networking system.

15. A system comprising:
at least one processor; and
at least one non-transitory computer readable storage medium storing instructions thereon that, when executed by the at least one processor, cause the system to:
   receive, from a client device associated with a user of a social networking system, a message intended for a plurality of users of the social networking system associated with the user;
   provide, for display on the client device, the message within a graphical user interface comprising a social networking newsfeed;
   determine that the message comprises a request for a referral of a provider of a product;
   provide, for display on the client device, a confirmation request embedded within the graphical user interface, the confirmation request querying the user to confirm that the message comprises the request for the referral;
   analyze a plurality of providers of the product to generate customized ratings of the plurality of providers for the user;
   identify suggested providers to refer to the user based on the customized ratings; and
   based on receiving a confirmation from the user and identifying the suggested providers, generate, for display on the client device, an additional graphical user interface comprising:
      an icon, identifying information, and an interactive element for each of the one or more of the suggested providers, wherein each interactive element is selectable to identify the corresponding suggested provider as a recipient suggested provider; and
      a single interactive messaging element for the user to input an inquiry message to be sent simultaneously, via the social networking system, to each recipient suggested provider.

16. The system of claim 15, further comprising instructions that, when executed by the at least one processor, cause the system to analyze the plurality of providers of the product to generate customized ratings by determining referral ratings for the plurality of providers based on a relationship within the social networking system between the user and each of the plurality of providers, a relationship within the social networking system between a recipient of the message and each of the plurality of providers, and a level of activity for each of the plurality of providers with the social networking system.

17. The system of claim 15, further comprising instructions that, when executed by the at least one processor, cause the system to:
   post, via the social networking system, the message for access by the plurality of users;
   identify a user-referred provider of the product from a comment to the posted message from a recipient of the message among the plurality of users;
   identify a sponsored provider of the product; and
   generate the additional graphical user interface comprising the interactive element for each of the one or more of the suggested providers by providing a first interactive element for the user-referred provider and a second interactive element for the sponsored provider.

18. A non-transitory computer readable medium storing instructions thereon that, when executed by at least one processor, cause a computer system to:
   receive, from a client device associated with a user of a social networking system, a message intended for a plurality of users of the social networking system associated with the user;
   provide, for display on the client device, the message within a graphical user interface comprising a social networking newsfeed;
   determine that the message comprises a request for a referral of a provider of a product;
   provide, for display on the client device, a confirmation request embedded within the graphical user interface, the confirmation request querying the user to confirm that the message comprises the request for the referral;
   analyze a plurality of providers of the product to generate customized ratings of the plurality of providers for the user;
   identify suggested providers to refer to the user based on the customized ratings; and
   based on receiving a confirmation from the user and identifying the suggested providers, generate, for display on the client device, an additional graphical user interface comprising:
      an icon, identifying information, and an interactive element for each of one or more of the suggested providers, wherein each interactive element is selectable to identify the corresponding suggested provider as a recipient suggested provider; and
      a single interactive messaging element for the user to input an inquiry message to be sent simultaneously, via the social networking system, to each recipient suggested provider.

19. The non-transitory computer readable medium of claim 18, further comprising instructions that, when executed by the at least one processor, cause the computer system to analyze the plurality of providers of the product to generate the customized ratings by determining referral ratings for the plurality of providers based on a relationship within the social networking system between the user and each of the plurality of providers, a relationship within the social networking system between a recipient of the message and each of the plurality of providers, and a level of activity for each of the plurality of providers with the social networking system.

20. The non-transitory computer readable medium of claim 18, further comprising instructions that, when executed by the at least one processor, cause the computer system to:

post, via the social networking system, the message for access by the plurality of users;
identify a user-referred provider of the product from a comment to the posted message from a recipient of the message among the plurality of users;
identify a sponsored provider of the product; and
generate the additional graphical user interface comprising the interactive element for each of the one or more of the suggested providers by providing a first interactive element for the user-referred provider and a second interactive element for the sponsored provider.

* * * * *